US012404099B2

(12) United States Patent
Austrheim et al.

(10) Patent No.: US 12,404,099 B2
(45) Date of Patent: Sep. 2, 2025

(54) RESCUE SYSTEM AND METHODS FOR RETRIEVING A MALFUNCTIONING VEHICLE FROM A RAIL SYSTEM

(71) Applicant: Autostore Technology AS, Nedre Vats (NO)

(72) Inventors: Trond Austrheim, Etne (NO); Øystein Gjerdevik, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 703 days.

(21) Appl. No.: 17/770,563

(22) PCT Filed: Nov. 4, 2020

(86) PCT No.: PCT/EP2020/080929
§ 371 (c)(1),
(2) Date: Apr. 20, 2022

(87) PCT Pub. No.: WO2021/094161
PCT Pub. Date: May 20, 2021

(65) Prior Publication Data
US 2022/0388773 A1 Dec. 8, 2022

(30) Foreign Application Priority Data
Nov. 12, 2019 (NO) .................................. 20191338

(51) Int. Cl.
*B65G 1/04* (2006.01)
*B65G 1/06* (2006.01)

(52) U.S. Cl.
CPC ......... *B65G 1/0464* (2013.01); *B65G 1/0478* (2013.01); *B65G 1/065* (2013.01); *B65G 2207/40* (2013.01)

(58) Field of Classification Search
CPC .... B65G 1/0464; B65G 1/0478; B65G 1/065; B65G 2207/40; B65G 2201/0258;
(Continued)

(56) References Cited

U.S. PATENT DOCUMENTS

2018/0194571 A1* 7/2018 Fryer .................... B65G 1/0478
2019/0054932 A1* 2/2019 Stadie ........................ B61B 5/02

FOREIGN PATENT DOCUMENTS

CN 109748022 A 5/2019
GB 2539562 A 12/2016
(Continued)

OTHER PUBLICATIONS

International Search Report issued in PCT/EP2020/080929 on Feb. 8, 2021 (4 pages).
(Continued)

*Primary Examiner* — Thomas Randazzo
(74) *Attorney, Agent, or Firm* — Baker Botts L.L.P.

(57) ABSTRACT

A rescue system for retrieving a malfunctioning vehicle from a rail system of an automated storage and retrieval system includes a first rescue vehicle and a second rescue vehicle. The rail system includes a plurality of rails with tracks extending in an X-direction and a plurality of rails with tracks extending in a Y-direction perpendicular to the X-direction, and a plurality of remotely operated vehicles configured to move in the X and Y-directions on the tracks of the rail system. The first rescue vehicle is configured to run on the tracks of the rail system. The first rescue vehicle is provided with a lifting device on one side of the vehicle, which faces for engagement in a first X-direction. The second rescue vehicle is configured to run on the tracks of the rail system. The second rescue vehicle is provided with a lifting device on an opposite side of the vehicle, which faces for engagement in a second X-direction opposite to the (Continued)

first X-direction. The first and second rescue vehicles are configured to work in tandem so that when one of the plurality of remotely operated vehicles malfunctions, the first and second rescue vehicles can position themselves on the rail system on opposite sides of the malfunctioning vehicle to engage their respective lifting devices with the opposite sides of the malfunctioning vehicle. The first and second rescue vehicles operate their lifting devices simultaneously so as to lift the malfunctioning vehicle off the rail system and transport the malfunctioning vehicle.

24 Claims, 12 Drawing Sheets

(58) Field of Classification Search
CPC .... B65G 2207/30; B65G 1/04; B65G 1/0492; B65G 1/06; B65G 1/0414
See application file for complete search history.

(56) References Cited

FOREIGN PATENT DOCUMENTS

| | | |
|---|---|---|
| JP | 2016141323 A | 8/2016 |
| JP | 2017509564 A | 4/2017 |
| NO | 345931 B1 | 11/2021 |
| WO | 2015/140216 A1 | 9/2015 |
| WO | 2015/193278 A1 | 12/2015 |
| WO | 2017/148939 A1 | 9/2017 |
| WO | 2018/146304 A1 | 8/2018 |
| WO | 2019/206672 A2 | 10/2019 |

OTHER PUBLICATIONS

Written Opinion of the International Searching Authority issued in PCT/EP2020/080929 on Feb. 8, 2021 (11 pages).
Written Opinion of the International Preliminary Examining Authority issued in PCT/EP2020/080929 mailed on Sep. 23, 2021 (12 pages).
Norwegian Search Report issued in NO 20191338 mailed on Jun. 10, 2020 (2 pages).
Mari Uchida, Notice of Reasons for Rejection for Japanese Patent Application No. 2022526366, dated Oct. 25, 2024, 15 pages, pub. by the JPO.
Mari Uchida, Notice of Reasons for Rejection for Japanese Patent Application No. 2022526366, dated Mar. 12, 2025, 4 pages, pub. by the JPO, Tokyo, Japan.
Yang, Young June, Office Action in KR1020227019246, mailed Jun. 16, 2025, 17 pages, Korean Intellectual Property Office, Daejeon, Korea.

* cited by examiner

RESCUE SYSTEM AND METHODS FOR RETRIEVING A MALFUNCTIONING VEHICLE FROM A RAIL SYSTEM

FIELD OF THE INVENTION

The present invention relates to an automated storage and retrieval system for storage and retrieval of containers, and in particular to a rescue system for retrieving a malfunctioning vehicle from a rail system, a method of retrieving a malfunctioning container handling vehicle from a rail system and a rescue vehicle for use in said systems and method.

BACKGROUND AND PRIOR ART

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of set wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 is shown in in FIG. 3 and is indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid is referred to as a storage cell. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves into which the wheels of the vehicles are inserted. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

From prior art WO2015140216A1 it is known a robotic service device for use on a robotic picking system grid. The robotic service device is capable of driving to any location on the grid in order to perform maintenance operations or cleaning. Additionally, the service device may be used to rescue robotic load handling devices operational in the picking system. The robotic service device may comprise a releasable docking mechanism to enable it to dock and latch on to malfunctioning load handling devices. The service device may also be provided with cleaning means and camera means to enable the condition of the grid and other robotic devices to be monitored.

It may be a problem with the prior art robotic service vehicles that the required lifting capacity of the single robotic service vehicle lifting a malfunctioning vehicle off the rail system is too high such that the robotic service vehicle is either not able to lift the malfunctioning vehicle and/or, if the robotic service vehicle is able to lift the malfunctioning vehicle off the rail system, it is unstable during transport requiring large counterweight(s) and or slow transportation speed/acceleration.

The required lifting capacity may be even higher if the malfunction vehicle carries a heavy storage container. This may incur an even larger problem.

It is an objective of the invention to solve the challenges of retrieving vehicles from a rail system.

SUMMARY OF THE INVENTION

The present invention is set forth and characterized in the independent claims, while the dependent claims describe other characteristics of the invention. The invention provides for the possibility of rescuing container handling vehicles while the automated storage and retrieval system is in operation, i.e. while the remaining container handling vehicles are in operation on the rail system. The invention eliminates the need for a manned service vehicle improving HSE for the system. However, in the event of a major collision where vehicles are off track, it may be required that an operator enters the rail system.

It is described a rescue system for retrieving a malfunctioning vehicle from a rail system of an automated storage and retrieval system, the rail system comprising a plurality of rails with tracks extending in an X-direction and a plurality of rails with tracks extending in a Y-direction perpendicular to the X-direction, a plurality of remotely operated vehicles configured to move in the X and Y-directions on the tracks of the rail system, a first rescue vehicle configured to run on the tracks of the rail system, the first rescue vehicle being provided with a lifting device on one side of the vehicle, the lifting device facing for engagement in a first X-direction;

a second rescue vehicle configured to run on the tracks of the rail system, the second rescue vehicle being provided with a lifting device on an opposite side of the vehicle, the lifting device facing for engagement in a second X-direction opposite to the first;

wherein the first and second rescue vehicles are configured to work in tandem so that when one of the plurality of remotely operated vehicles malfunctions, the first and second rescue vehicles can position themselves on the rail system on opposite sides of the malfunctioning vehicle to engage their respective lifting devices with the opposite sides of the malfunctioning vehicle and operate their lifting devices simultaneously so as to lift the malfunctioning vehicle off the rail system and transport the malfunctioning vehicle.

The lifting device may comprise a vertical plate with a lip extending therefrom. Alternatively, other types of lifting devices may be used as long as they provide the required function of a horizontal part engageable with a malfunctioning vehicle such that the malfunctioning vehicle can be lifted off the rail system by vertical movement of the horizontal part relative the rail system. The lifting device may further comprise any necessary components required to lift and lower the lifting device relative the rail system, such as motor, any necessary guide or actuator for guiding the lifting device substantially vertical, connection to a power source for driving the motor etc. The motor, and possibly also the power source, may be designed with less lifting capacity than the prior art service vehicles which utilizes only one motor to lift a container handling vehicle off the grid.

The container handling vehicle can be in the form of prior art container handling vehicles as the ones exemplified in FIGS. 2 and 3A configured for receiving storage containers from below, or in the form of a container delivery vehicle configured for receiving storage containers from above.

It is further described a rescue system for retrieving a malfunctioning vehicle from a rail system of an automated storage and retrieval system, the rail system comprising a plurality of rails with tracks extending in an X-direction and a plurality of rails with tracks extending in a Y-direction perpendicular to the X-direction, the rails defining a plurality of grid cells, wherein a plurality of remotely operated vehicles are configured to move in the X and Y-directions on the tracks of the rail system, a first rescue vehicle comprising a first wheel base unit configured to run on the tracks of the rail system, the first wheel base unit providing a mobile platform corresponding in area to a single grid cell for a first vehicle rescue module mounted thereon, the first vehicle rescue module being orientated in a first direction of the rail system;

a second rescue vehicle comprising a second wheel base unit configured to run on the tracks of the rail system, the second wheel base unit providing a mobile platform corresponding in area to a single grid cell for a second vehicle rescue module mounted thereon, the second vehicle rescue module being orientated in a second direction of the rail system opposite to the first direction;

wherein the first and second rescue vehicles are configured to work in tandem to perform rescue operations on a malfunctioning vehicle of the plurality of remotely operated vehicles, the vehicle rescue modules being arranged to engage opposite sides of the malfunctioning vehicle and lift it off the rail system using a lifting device through being orientated in opposite facing directions.

The vehicle rescue modules may comprise a lifting plate with a lip extending at a height above an upper surface of the wheel base unit. The height may be within 50 mm or it may be less or it may be more.

The plurality of remotely operated vehicles may comprise wheel base units providing mobile platforms, each corresponding in area to a single grid cell of the rail system, for storage container lifting modules mounted thereon.

A grid cell may be defined as the area, including the track width, delimited by a pair of tracks in X and Y direction around an access opening of the rail system.

The wheel base units may be identical.

The first and second rescue vehicles may comprise communication means for synchronous operation. This may further increase the chances of a successful lifting operation by preventing jamming which may occur during un-even lifting.

The communication means may enable communication between the first and second rescue vehicles. Such communication may be internal or direct communication between the rescue vehicles. The means of internal or direct communication can be IR, wireless (WiFi), light (LiFi), Bluetooth, NFC or similar.

The system may further comprise a control system, and the control system may comprise cooperative communication means configured to communicate with the communication means of the first and second rescue vehicles to operate synchronously.

The first or second rescue vehicle may be a master rescue vehicle and the other of said first or second rescue vehicle may be a slave rescue vehicle which is at least partly operated by instructions from the master rescue vehicle. The master/slave operation may be limited to the lifting operation, while normal operation of the rescue vehicle(s) in terms of horizontal movement on the rail system may be under control of the control system operating the container handling vehicles. When entering the rail system, the rescue vehicles may be added to the control system operating the remotely operated vehicles such that they are operated as a standard container handling vehicle reducing the probability of collision with the container handling vehicles. Once two rescue vehicles have lifted a malfunctioning container handling vehicle, the control system know how many cell spaces the two rescue vehicles and the malfunctioning container handling vehicle requires, and will take this into consideration when determining what path to use for transporting the malfunctioning vehicle to e.g. a service area.

The rail system may be at a top level of a storage and retrieval system.

The rail system may be a delivery rail system.

The rescue vehicles may comprise two set of wheels for movement in the X and Y directions along the rail system.

The lifting device may comprise an actuator configured to raise and lower the malfunctioning vehicle relative the rail system.

The lifting device may be configured to only move up and down in the Z-direction (i.e. be raised and lowered). This may be achieved using a lifting device in the form of a linear actuator or similar.

However, alternatively, the lifting device may be configured to, in addition to be moved up and down in the Z-direction, also be configured for lateral movement in the X-direction and/or the Y-direction. The latter being advantageous in operations where a larger contact area between the lifting device and the malfunctioning container handling vehicle is required.

At least one of the first and/or second rescue vehicles may comprise at least one rotary drive to winch up a lifting frame and or a track shift motor of the malfunctioning container handling vehicle. This render possible manual/mechanical oversteering of any stuck lifting device or gripper and or set of wheels of the container handling vehicle.

If a container handling vehicle malfunctions with the lifting device/grippers in a lower position, the rescue vehicle may comprise rotary drive for connection to the malfunction vehicle and raise the lifting device/grippers before the malfunctioning vehicle is transported off the rail system.

The rotary drive may be a pipe motor which is used to override the lifting frame/grippers motor and/or track shift motor. One or more cameras arranged on the same or another rescue vehicle may be arranged to monitor the process and provide useful information in terms of aligning the rotary drive relative the complementary socket on the malfunctioning vehicle. In one aspect, the camera may be, or form part of, the communication means between the first and second rescue vehicles.

The at least one rotary drive may be pivotable, and an axis of the rotary drive may be configured to be pivoted between a stowed vertical position during movement of the first or second rescue vehicle on the rail system, and may further be configured to be pivoted to a deployed horizontal position for winching up the lifting frame and or the track shift motor of a malfunctioning container handling vehicle.

In particular, the rotary drive may be pivoted between its stowed position to the deployed horizontal position as the rescue vehicle is moved towards the malfunctioning vehicle so that the drive shaft can protrude to engage the socket in the malfunctioning vehicle as it approaches.

The rotary drive for the lifting frame may be arranged in an upper part of the rescue vehicle and, when the rotary drive is in the deployed horizontal position, the rotary drive can be supported by an actuator.

Alternatively, the rotary drive can be connected to a linear actuator for movement between the stowed position and the deployed position. When in the stowed position, the perimeter of the rotary drive may be arranged within a horizontal perimeter of the wheel base unit, and when in the deployed position, at least a portion of the rotary drive may extend beyond the perimeter of the wheel base unit. In other words, when in the stowed position, the rescue vehicle may have a footprint equal to or less than a grid cell of the rail system and in the deployed position, the rotary drive may extend into a neighboring grid cell upon actuation of the linear actuator. This provides for the possibility that the service vehicle does not occupy more than one cell when moving on the rail system.

It is further described a rescue vehicle for retrieving a malfunctioning vehicle from a rail system of an automated storage and retrieval system, the rail system comprising a plurality of rails with tracks extending in an X-direction and a plurality of rails with tracks extending in a Y-direction perpendicular to the X-direction, a plurality of remotely operated vehicles configured to move in the X and Y-directions on the tracks of the rail system, wherein the rescue vehicle comprises a wheel base unit configured to run on tracks of the rail system, the wheel base unit providing a mobile platform corresponding in area to a single grid cell for a vehicle rescue module mounted thereon, the vehicle rescue module being orientated in a first direction of the rail system;

wherein the vehicle rescue module comprises a lip on at least one of the sides of the module arranged at a level above the level of the wheel base unit.

The rescue vehicle may further comprise a rotary drive to winch up a lifting frame and or a track shift motor of a malfunctioning container handling vehicle.

It is further described an automated storage and retrieval system, comprising:
  a framework structure comprising upright members, horizontal members and a storage volume comprising storage columns arranged in rows between the upright members and the horizontal members,
  a plurality of storage containers stacked one on top of one another to form stacks,
  a rail system comprising a plurality of rails with tracks extending in an X-direction and a plurality of rails with tracks extending in a Y-direction perpendicular to the X-direction,
  a plurality of remotely operated vehicles configured to move in the X and Y-directions on the tracks of the rail system,
  a rescue system as defined above.

It is further described a method of retrieving a malfunctioning container handling vehicle from a rail system with perpendicular tracks in X and Y direction and wherein a plurality of remotely operated vehicles are arranged on the rail system, and wherein each of the vehicles comprises a vehicle body and side portions, and wherein at least two opposite side portions on each vehicle comprises a recess, wherein the method comprises:
  determining an anomaly in an operation condition of a vehicle on the rail system,
  registering the vehicle with the anomalous operational condition as a malfunctioning vehicle, registering a position of the malfunctioning vehicle relative to the supporting rail system, operating a first rescue vehicle configured to run on the tracks of the rail system, the first rescue vehicle being provided with a lifting device on one side of the vehicle, the lifting device facing for engagement in a first X-direction;

operating a second rescue vehicle configured to run on the tracks of the rail system, the second rescue vehicle being provided with a lifting device on an opposite side of the vehicle, the lifting device facing for engagement in a second X-direction opposite to the first;

operating the first and second rescue vehicles in tandem by position the first and second rescue vehicles on opposite sides of the malfunctioning vehicle, engaging the respective lifting devices of the first and second rescue vehicles with the opposite sides of the malfunctioning vehicle, operating the lifting devices simultaneously so as to lift the malfunctioning vehicle off the rail system and transport the malfunctioning vehicle.

The malfunctioning container handling vehicle may comprise a lifting device for lifting and lowering storage containers from below, or the malfunctioning container handling vehicle may be a delivery vehicle configured to receive storage containers from above.

It is further described a method of retrieving a malfunctioning container handling vehicle from a rail system with perpendicular tracks in X and Y direction and wherein a plurality of remotely operated vehicles are arranged on the rail system, and wherein each of the vehicles comprises a vehicle body and side portions, and wherein at least two opposite side portions on each vehicle comprises a recess, wherein the method comprises:

determining an anomaly in an operation condition of a vehicle on the rail system, registering the vehicle with the anomalous operational condition as a malfunctioning vehicle, registering a position of the malfunctioning vehicle relative to the supporting rail system, operating a first rescue vehicle comprising a first wheel base unit configured to run on the tracks of the rail system, the first wheel base unit providing a mobile platform corresponding in area to a single grid cell for a first vehicle rescue module mounted thereon, the first vehicle rescue module being orientated in a first direction of the rail system;

operating a second rescue vehicle comprising a second wheel base unit configured to run on the tracks of the rail system, the second wheel base unit providing a mobile platform corresponding in area to a single grid cell for a second vehicle rescue module mounted thereon, the second vehicle rescue module being orientated in a second direction of the rail system opposite to the first direction;

operating the first and second rescue vehicles in tandem to perform rescue operations on a malfunctioning vehicle of the plurality of remotely operated vehicles, engaging the lifting devices on opposite sides of the malfunctioning vehicle, lifting the malfunctioning vehicle off the rail system.

The method may further comprise, prior to the step of engaging the lifting devices on opposite sides of the malfunctioning vehicle, a step of operating a rotary drive to winch up a lifting frame and or a track shift motor of a malfunctioning container handling vehicle.

It is further described a rescue system for retrieving a malfunctioning vehicle from a rail system with perpendicular tracks in X and Y direction and wherein a plurality of remotely operated vehicles are configured to move laterally on the rail system, wherein the rescue system comprises:

a first rescue vehicle with a vehicle body, the first rescue vehicle comprising a lifting device configured to be raised and lowered relative an underlying rail system, a second rescue vehicle with a vehicle body, the second rescue vehicle comprising a lifting device configured to be raised and lowered relative the underlying rail system, wherein the first rescue vehicle is configured to extend beyond a perimeter of a first side of the malfunctioning vehicle, and the second rescue vehicle is configured to extend beyond a perimeter of an opposite second side of the malfunctioning vehicle, and wherein, when the first and second rescue vehicles extend beyond the perimeter of the malfunctioning vehicle, the first and second lifting devices are configured to be operated simultaneous such that synchronous operation of the lifting devices lift the malfunctioning vehicle off the rail system.

In all of the disclosed examples, utilizing two rescue vehicles operating in common will require smaller lifting motors than when lifting a container handling vehicle using only one rescue vehicle where one single motor needs to be capable of lifting off the malfunctioning vehicle off the rail system.

Furthermore, the solution provides for more stable transport of malfunctioning vehicle when compared to when using a single rescue vehicle, because the solution gives an advantageous center of gravity.

Another advantage of the solution is a larger flexibility in accessing areas on the rail system compared to when using smaller rescue vehicles.

In order for the lifting device to support malfunctioning container handling vehicles without moving the lifting device horizontally relative the rescue vehicle during lifting operations, a part of the lifting device such as a lip or similar, may extend into a neighboring cell when the rescue vehicle is positioned in center of a cell. In order for the rescue vehicles to pass by container handling vehicles in neighboring cells, thereby occupying as little space on the rail system as possible, the container handling vehicles preferably have recesses on two or all sides where a neighboring rescue vehicle can pass, while delivery vehicles and so-called single cell robots may have recesses on all sides. The recesses may extend along the whole length of each side of the container handling vehicles. In addition, the recess may have a sufficient extension in the Z direction to take into account different height of the container handling vehicle dependent on which of the set of wheels that are in contact with the rail system.

These can be run on a separate control system, but it would have been simplest and run on the same system as the rest of the vehicles.

It is important to note that the (single-cell) drones can be lifted from both the short side (Y) and the long side (X).

In order to be able to engage with the malfunctioning container handling vehicle, the container handling vehicles may have at least one recess which is complementary shaped relative the lifting plate of the rescue vehicle to be lifted. However, as an alternative, the container handling vehicle may be lifted off the rail system by being sandwiched between two rescue vehicles from opposite sides and then lifted off the rail system, or by using magnets or similar. For example, the rescue vehicles may be fitted with a vertically moveable surface, e.g., a conveyor device or similar—the two rescue vehicles could then push together to hold the malfunctioning vehicle sandwiched between them.

The recess may be at the interface where a carrier module for a container support on a delivery vehicle or a container lifting module is mounted on to a wheel base unit.

Identical rescue vehicles may be used regardless of operating on a top level of a storage and retrieval system or on a delivery rail system, or on a single/single, single/double or double/double track. This provides for large flexibility as the rescue vehicle is the same either in retrieving container handling vehicles with lifting device/grippers or delivery vehicles. For example, using identical rescue vehicles, with opposite orientation, such as one lifting device east-facing and one lifting device west-facing, will provide for the possibility of retrieving both north-facing and south-facing malfunctioning vehicles.

The rescue vehicle may further be provided with visual inspection means such as to perform visual inspection on the rail system or control or check vehicles that have problems on the rail system. The visual inspection means may comprise one or more cameras.

Following drawings are appended to facilitate the understanding of the invention. The drawings show embodiments of the invention, which will now be described by way of example only, where:

BRIEF DESCRIPTION OF THE DRAWINGS

FIG. 3B shows a part of the system having a delivery rail system with container delivery vehicles operating below the rail system of container handling vehicles and FIG. 3C shows an example of a container delivery vehicle having a storage container stored within;

DETAILED DESCRIPTION OF THE INVENTION

Figure 1:
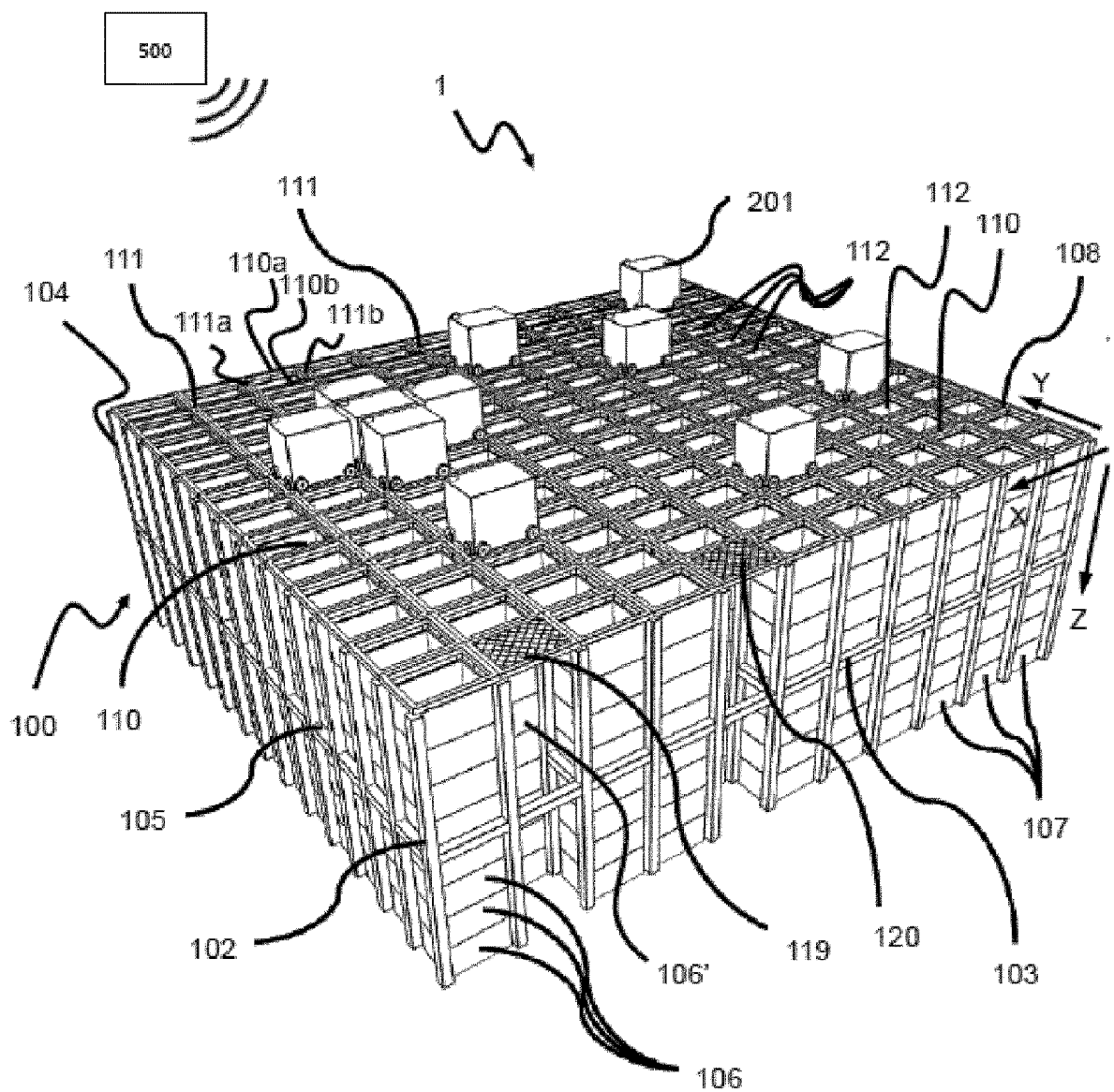
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
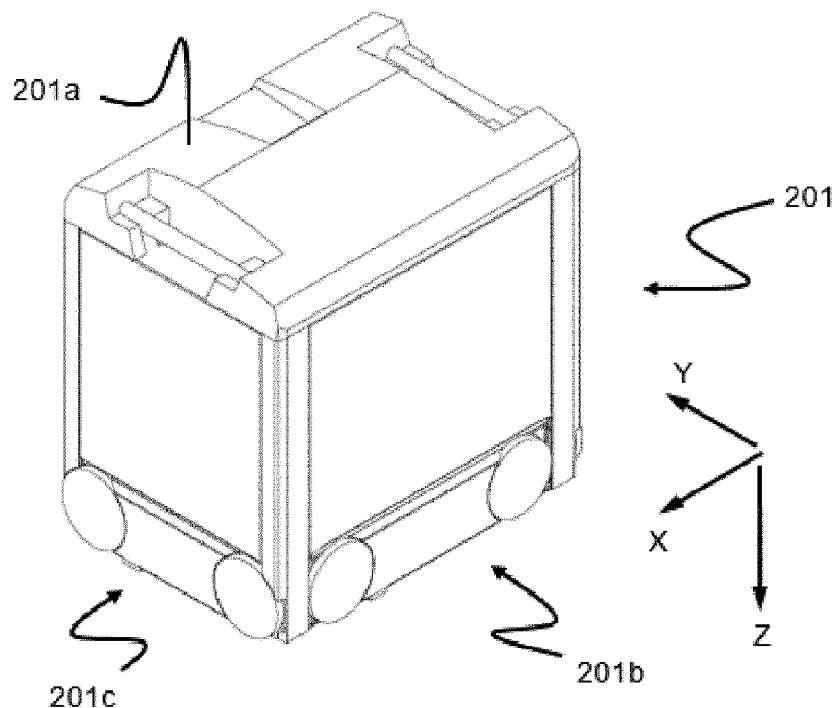
FIG. 2 is a perspective view of a prior art container handling vehicle having a centrally arranged cavity for carrying storage containers therein.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 3A:
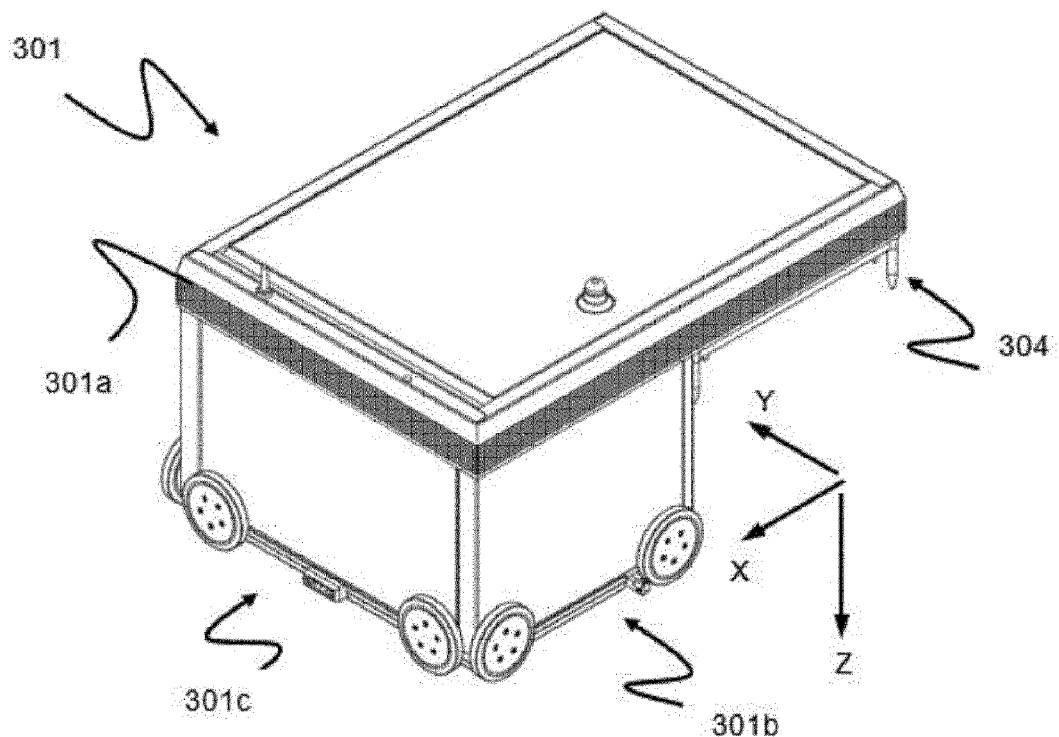
FIG. 3A is a perspective view of a prior art container handling vehicle having a cantilever for carrying storage containers underneath.
Figure 3B:
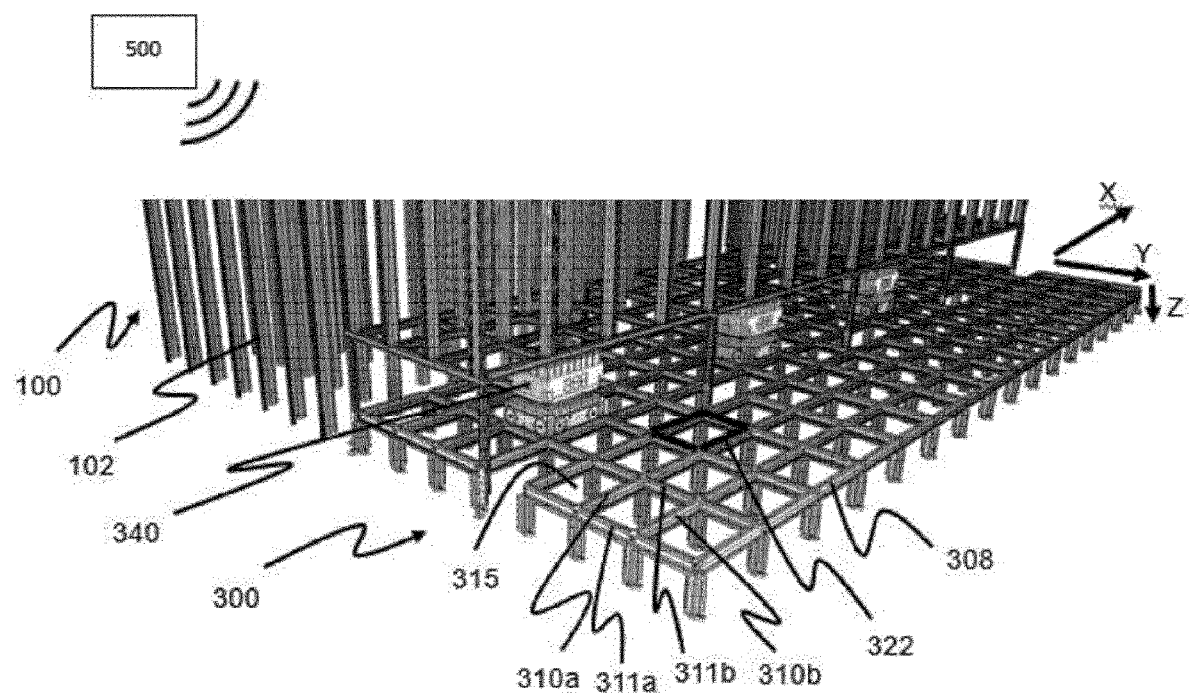
FIGS. 3B and 3C are perspective views of an exemplary automated storage and retrieval system according to the invention, where

A different automated storage and retrieval system 1 is shown in part in FIG. 3B. The upright members 102 constitute part of a framework structure 100 onto which a transport rail system 108 with a plurality of container handling vehicles 201,301 are operating.

Below this transport rail system 108, near the floor level, another framework structure 300 is shown which partly extends below some of the storage columns 105 of the framework structure 100. As for the other framework structure 100, a plurality of vehicles 340 may operate on a rail system 308 comprising a first set of parallel rails 310 directed in a first direction X and a second set of parallel rails 311 directed in a second direction Y perpendicular to the first direction X, thereby forming a grid pattern in the horizontal plane $P_L$, comprising a plurality of rectangular and uniform grid locations or grid cells 322. Each grid cell of this lower rail system 308 comprises a grid opening 315 being delimited by a pair of neighboring rails 310a,310b of the first set of rails 310 and a pair of neighboring rails 311a,311b of the second set of rails 311.

The part of the lower rail system 308 that extends below the storage columns 105 are aligned such that its grid cells 322 are in the horizontal plane $P_L$, coincident with the grid cells 122 of the upper rail system 108 in the horizontal plane P.

Hence, with this particular alignment of the two rail systems 108,308, a storage container 106 being lowered down into a storage column 105 by a container handling vehicle 250 can be received by a delivery vehicle 340 configured to run on the rail system 308 and to receive storage containers 106 down from the storage column 105. In other words, the delivery vehicle 340 is configured to receive storage containers 106 from above, preferably directly from the container handling vehicle 201,301.

Figure 3C:
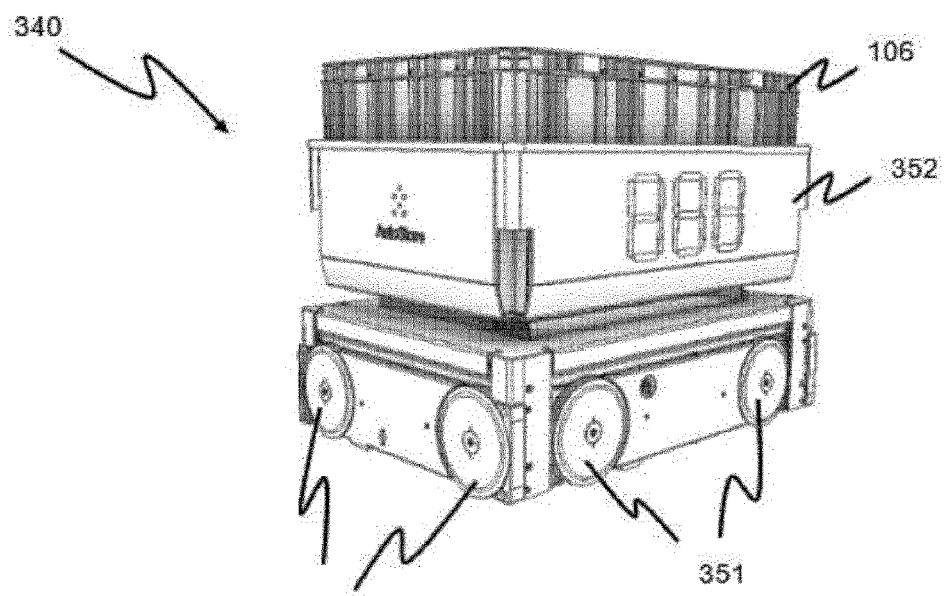

FIG. 3C shows an example of such a delivery vehicle 340 comprising a wheel assembly 351 similar to the wheel assembly 251 described for the prior art container handling vehicle 250 and a storage container support 352 for receiving and supporting a storage container 106 delivered by an above container handling vehicle 201,301.

After having received a storage container 106, the delivery vehicle 340 may drive to an access station adjacent to the rail system 308 (not shown) for delivery of the storage container 106 for further handling and shipping.

Figure 4A:
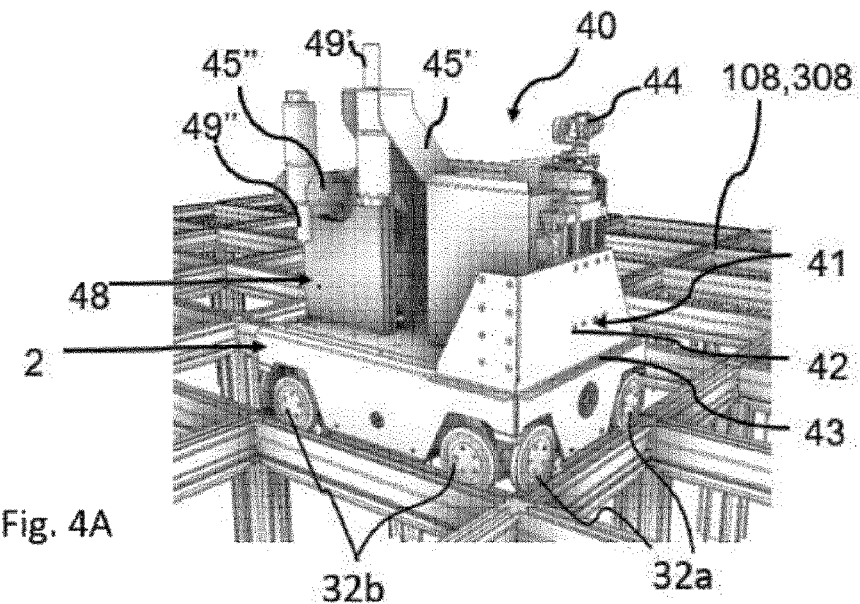
FIGS. 4A, 4B and 4C are perspective views of a rescue vehicle seen from different sides, where the rescue vehicle comprises a pivotable actuator for moving the rotary drive.
Figure 4B:
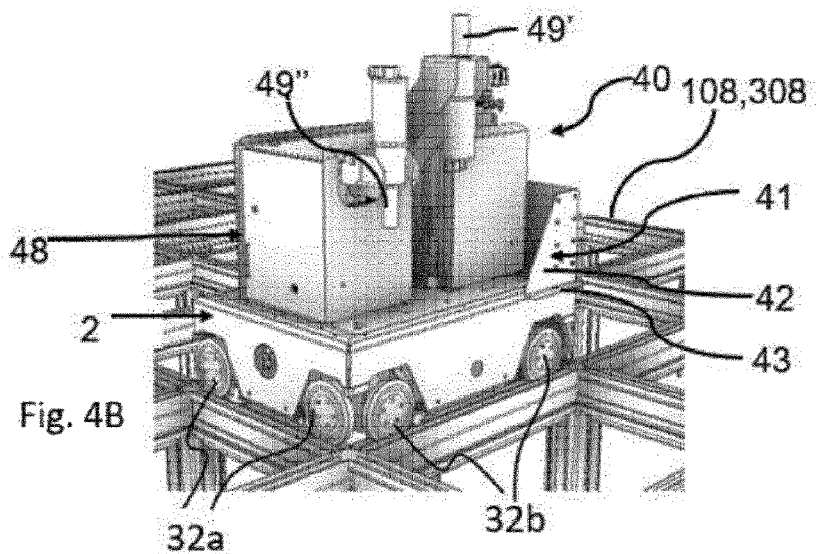
Figure 4C:
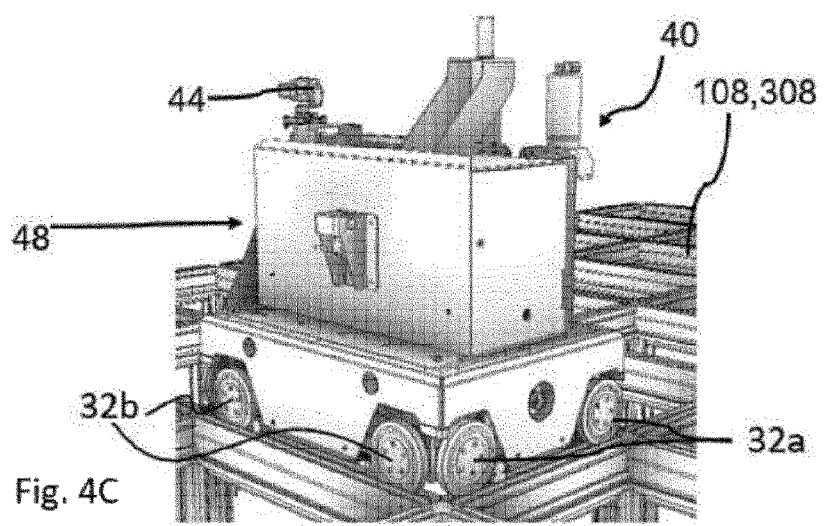

FIGS. 4A, 4B and 4C are perspective views of a rescue vehicle 40 seen from different sides. The rescue vehicle 40 comprises a wheel base 2 and a rescue module 48 mounted thereon. The lifting device 41 is disclosed with a vertical plate 42 with a lip 43 extending therefrom. In the disclosed example, the lifting device 41 is on a short side of the rescue vehicle 40 and the lip 43 extends along the whole side and further around a corner of the rescue vehicle 40 and at least partly along an adjacent long side. The part of the lip 43 on the long side of the rescue vehicle may extend shorter and or along the whole length of long side. In one example, there may be a continuous lip 43 around the whole rescue vehicle 40, i.e. there may be a lip 43 on all sides of the rescue vehicle 40.

The rescue vehicle 40 is disclosed with visual inspection means 44 such as to perform visual inspection on the rail system 108,308 or control or check vehicles that have problems on the rail system 108, 308, and or to monitor or assist in rescuing operations. The visual inspection means 44 may comprise one or more cameras.

The rescue vehicle is disclosed with two pivotable actuators 45',45" for moving two rotary drives 49',49", respectively. The rotary drive denoted 49' is for manipulating the track shift motor of a malfunctioning container handling vehicle, whereas the rotary drive denoted 49" is for manipulating a lifting frame/gripper motor of a malfunctioning container handling vehicle to rotate the lifting frame motor and any carried storage container 106 up and above the top of the rail system 108,308 such that the malfunctioning vehicle can be transported across the rail system 108,308. In all FIGS. 4A-4C, the rotary drives 49',49" are in the stowed vertical position. Furthermore, as disclosed in all FIGS. 4A-4C, the footprint of the rescue vehicle 40 is equal to or less than a grid of the underlying rail system 108,308.

Figure 5A:
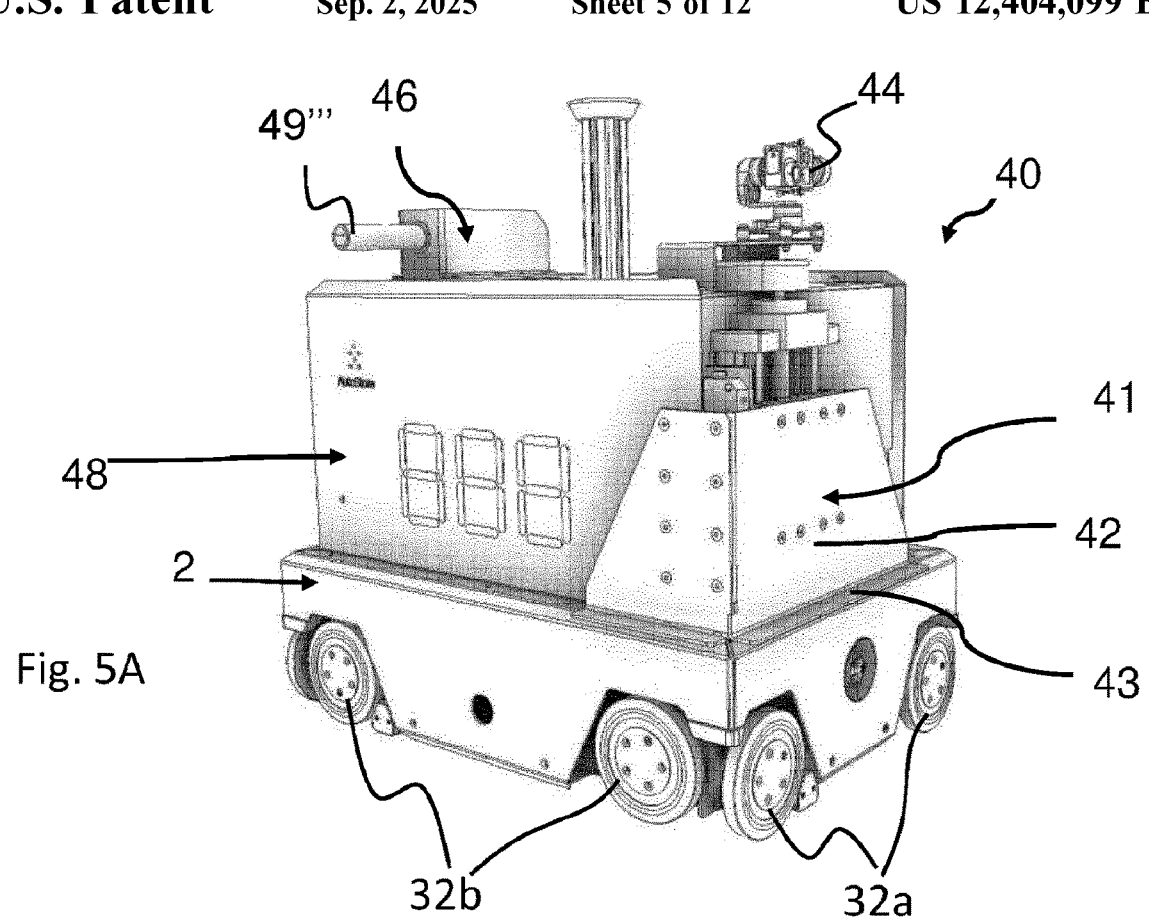
FIGS. 5A and 5B show an example of a rescue vehicle comprising a linear actuator for moving the rotary drive.
Figure 5B:
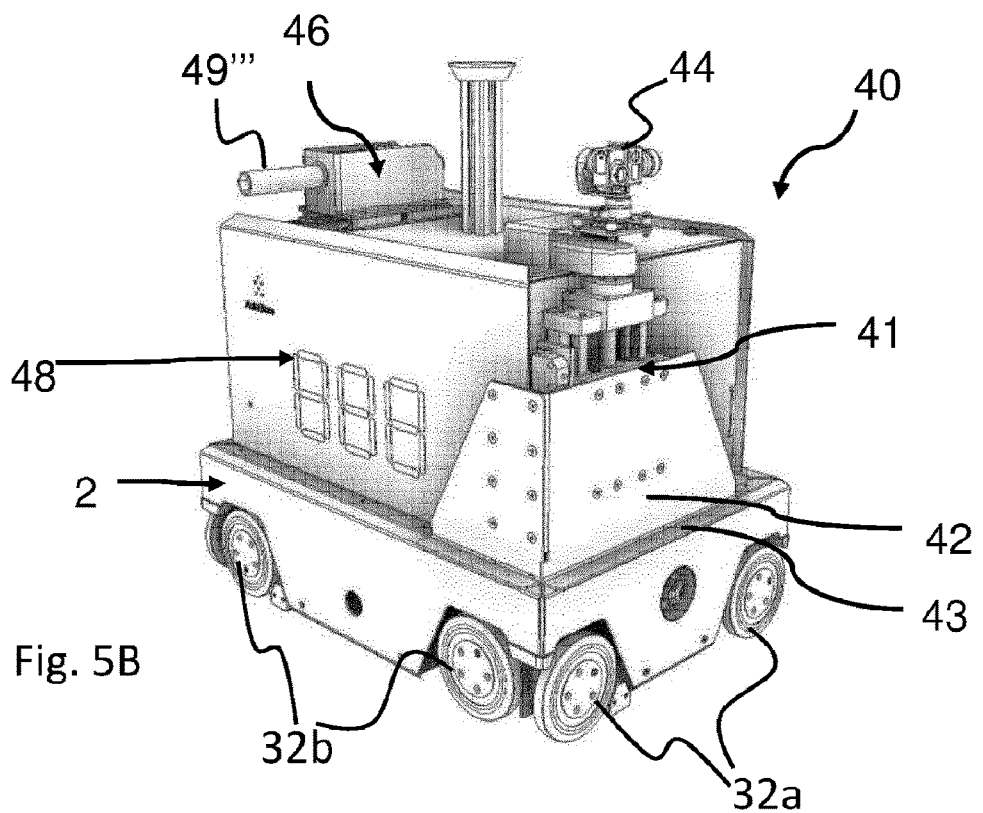

FIGS. 5A and 5B show an example of a rescue vehicle 40 comprising a wheel base unit 2 and a vehicle rescue module 48 mounted thereon. Instead of the pivotable actuator of the rescue vehicle 40 in FIGS. 4A-4C, the rescue vehicle 20 comprises a linear actuator 46 for moving the rotary drive 49'''. The linear actuator 46 is arranged for moving the rotary drive 49''' between the stowed position (FIG. 5A) and the deployed position (FIG. 5B). As shown in FIG. 5A, when in the stowed position, the perimeter of the rotary drive 49''' is arranged within a horizontal perimeter of the wheel base unit 2 of the rescue vehicle 40, and when in the deployed position, at least a portion of the rotary drive 49''' may extend beyond the perimeter of the wheel base unit 2. The other components of the rescue vehicle 40 may be similar to the ones described in relation to FIGS. 4A-4C.

FIGS. 6A-6E show step-by-step two rescue vehicles of FIGS. 4A-4C when they are rescuing a container handling vehicle 240 with a cantilever construction (i.e. a prior art container handling vehicle 301 as shown in FIG. 3A).

Figure 6A:
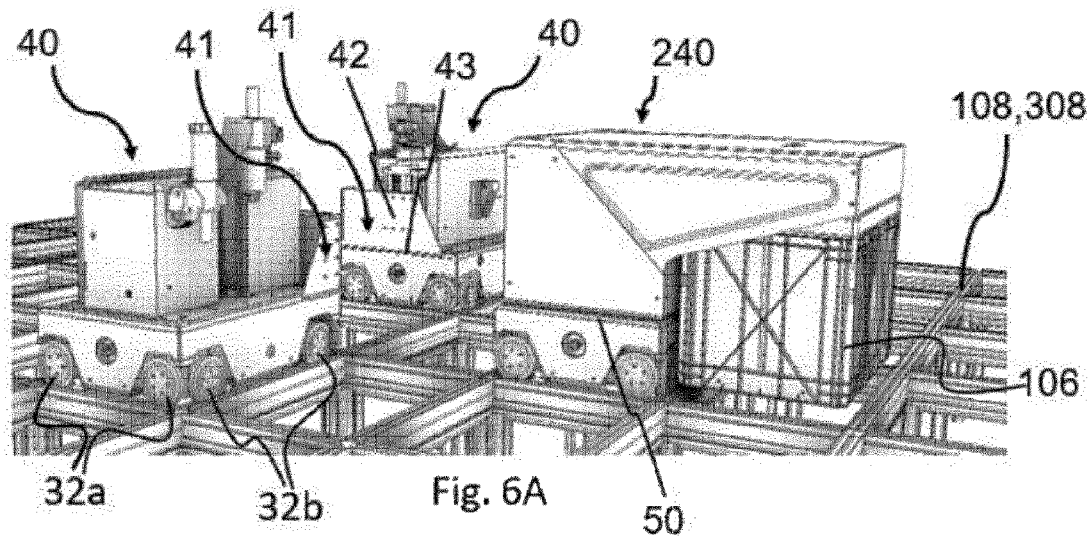
FIGS. 6A-6E show step-by-step two rescue vehicles of FIGS. 4A-4C when they are rescuing a container handling vehicle with a cantilever construction.
Figure 6B:
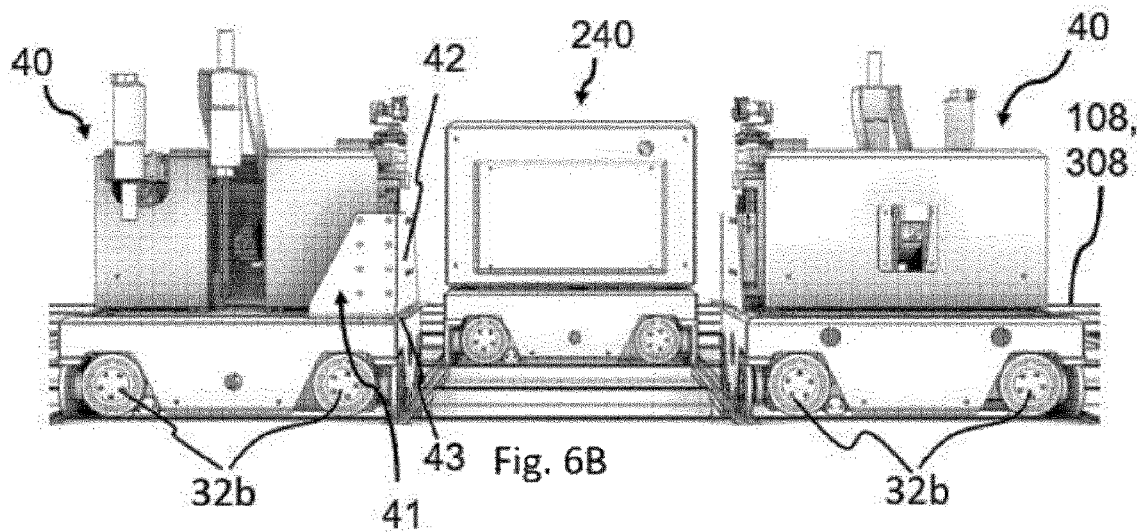

In FIG. 6A, the container handling vehicle 240 has malfunctioned with the lifting frame carrying a storage container 106 in an upper position (i.e. a lowermost part of the storage container 106 is above the underlying rail system 108,308 such that the container handling vehicle can be transported on the rail system 108, 308). The first rescue vehicle 40 comprises a lifting device 41 and is facing for engagement in a first direction, whereas the second rescue vehicle 40 comprises a lifting device on an opposite side of the vehicle relative the first rescue vehicle 40, the lifting device 41 facing for engagement in a second direction opposite to the first direction. In FIGS. 6A and 6B both of the rescue vehicles 40 are positioned in a distance away from the malfunctioning container handling vehicle 240.

Figure 6C:
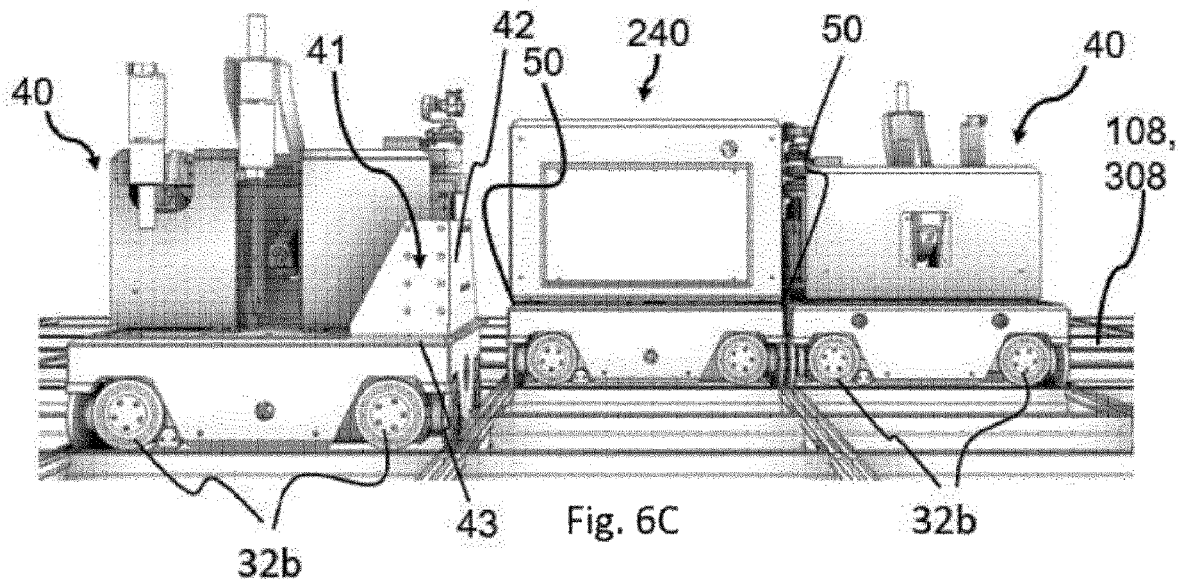

In FIG. 6C, one of the rescue vehicles 40 has positioned itself in a neighboring cell to the malfunctioning container handling vehicle 240, on one of the opposite sides of the container handling vehicle 240 which comprise a recess 50 for engagement with the lifting device 40 of the rescue vehicle 40. In the disclosed example, the lifting device 41 comprises a vertical plate 43 with a lip 43 for engagement with the recess 50.

Figure 6D:
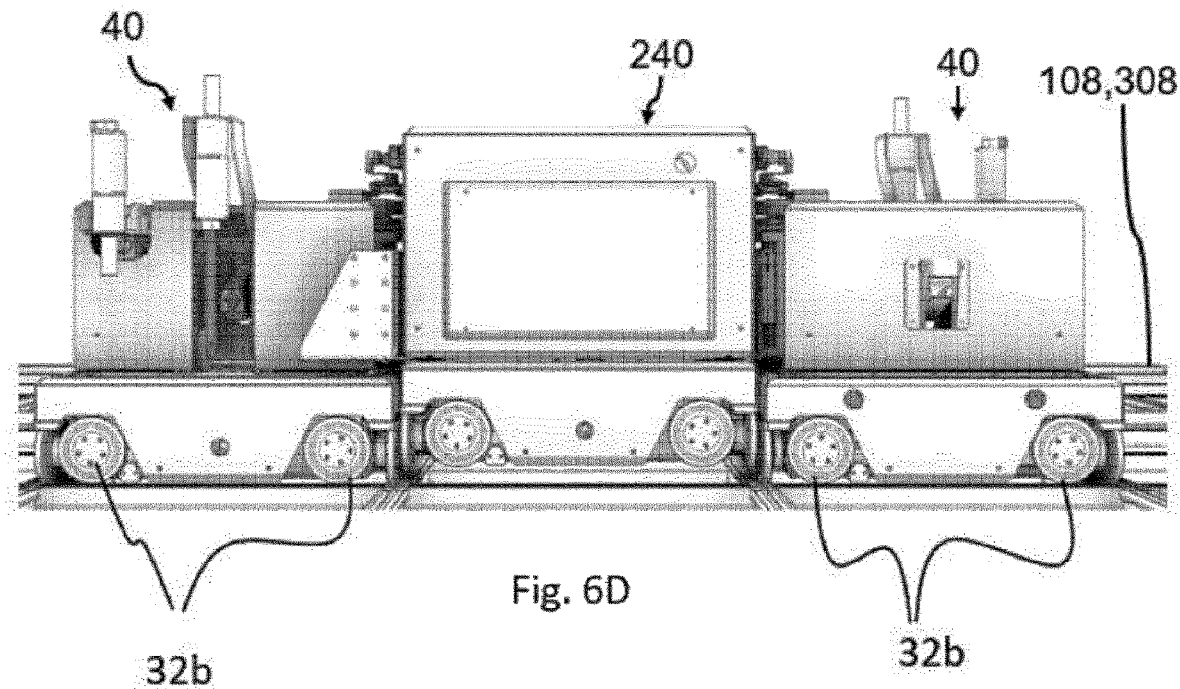
Figure 6E:
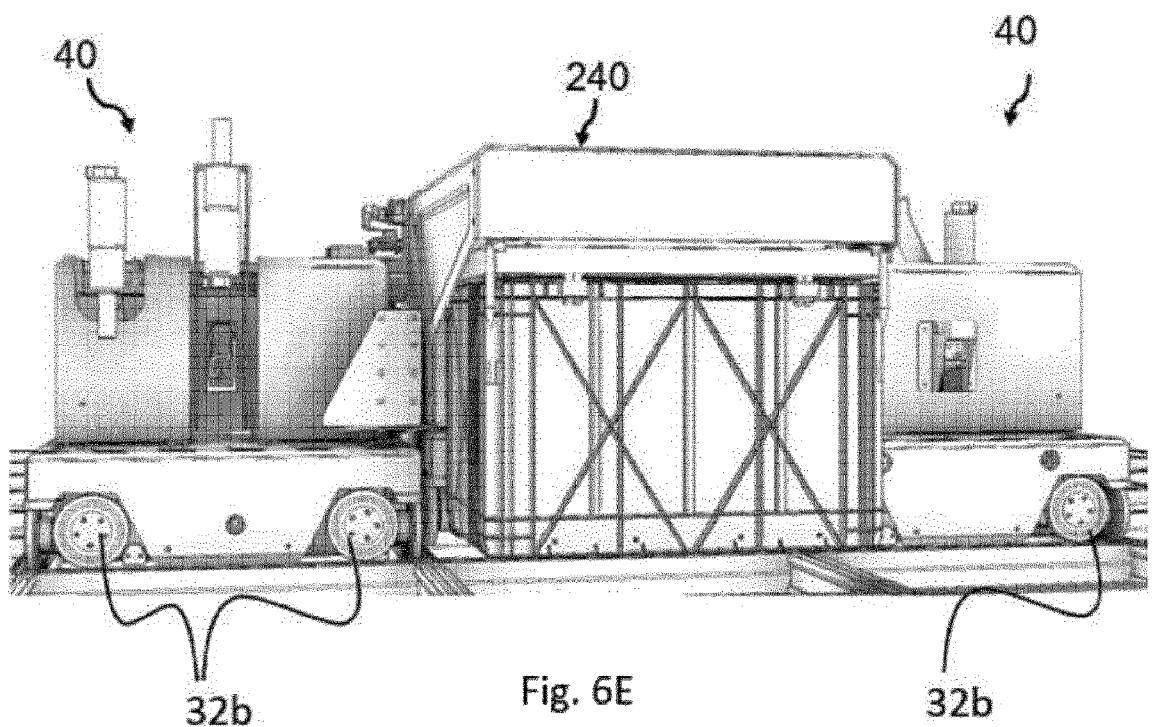

In FIG. 6D, the second rescue vehicle 40 has positioned itself on the opposite side of the malfunctioning container handling vehicle 240 and the lip 43 of the lifting device 41 has engaged with the recess 50. As is further seen in FIG. 6D, the first and second rescue vehicles 40 have lifted the malfunctioning container handling vehicle 240 off the rail system 108,308 by operating the lifting devices 41 simultaneously (i.e. in tandem). The malfunctioning container handling vehicle 240 may be transported off the rail system 108,308 to a dedicated area, such that a service area or similar. FIG. 6E is an opposite view of FIG. 6D.

FIGS. 7A-7E show step-by-step two rescue vehicles of FIGS. 4A-4C when they are rescuing a malfunctioning container handling vehicle in the form of a delivery vehicle 340 (see e.g. FIG. 3C). Similar rescue vehicles 40 as the ones disclosed in FIGS. 6A-6E are used when rescuing the delivery vehicle 340. The delivery vehicle 340 comprises a recess 50 around the whole circumference of the delivery vehicle 340 for engagement with the lifting device 40 of the rescue vehicle 40. The recess 340 may be arranged between a wheel base unit 2 of the delivery vehicle 340 and a container supporting unit 3 of the delivery vehicle 340.

Figure 7A:
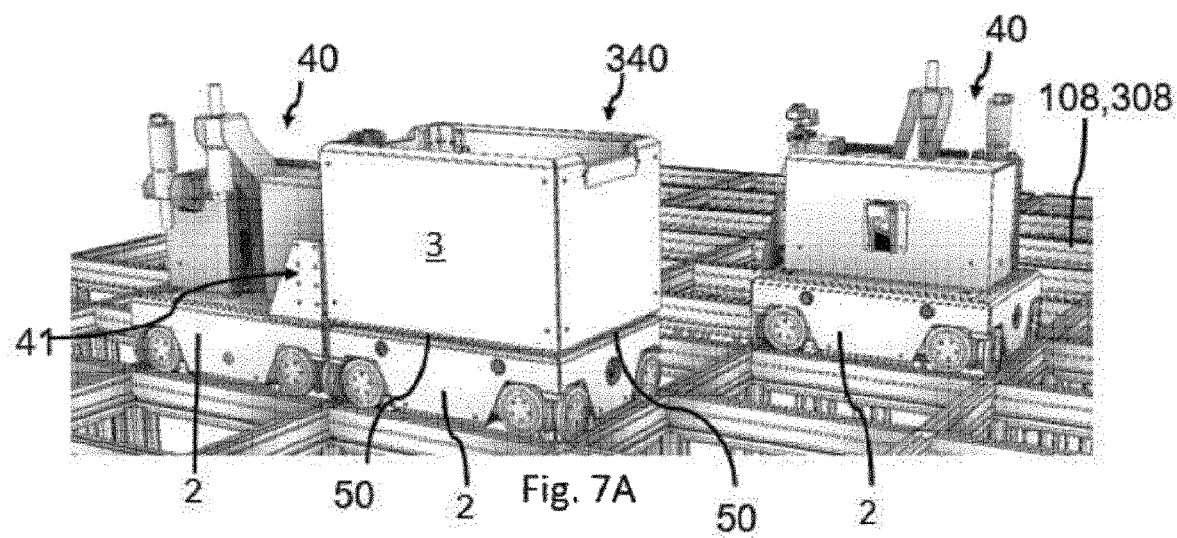
FIGS. 7A-7E show step-by-step two rescue vehicles of FIGS. 4A-4C when they are rescuing a container handling vehicle in the form of a delivery vehicle configured to receive storage containers from above.

Referring to FIG. 7A, one of the rescue vehicles 40 has positioned itself in a neighboring cell to the malfunctioning container handling vehicle 340, on one of the opposite sides of the malfunctioning delivery vehicle 340. The other rescue vehicle 40 is arranged in a distance from the malfunctioning delivery vehicle 340.

Figure 7B:
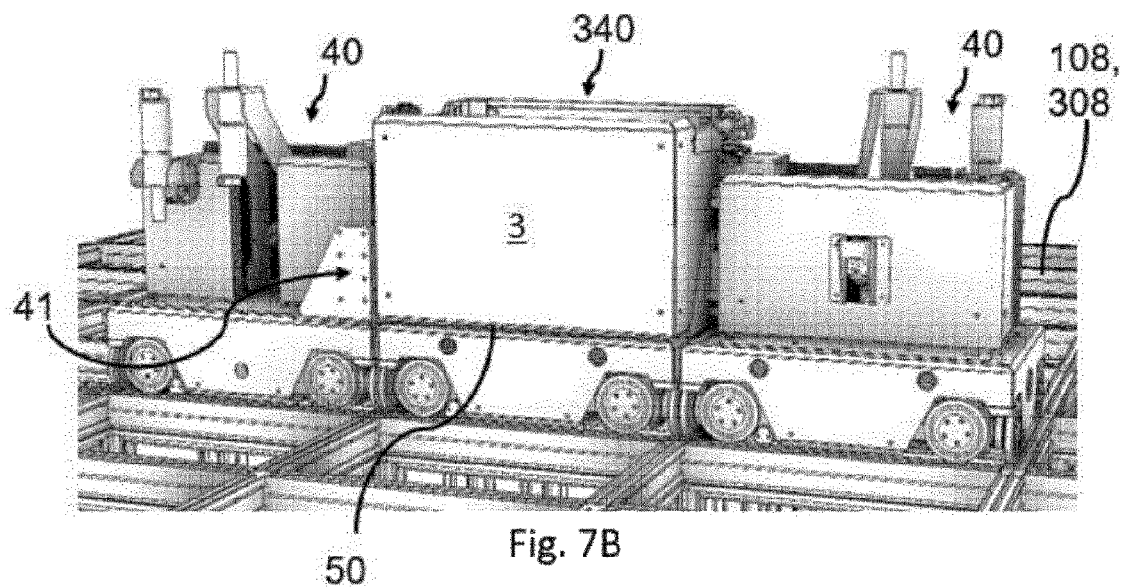
Figure 7C:
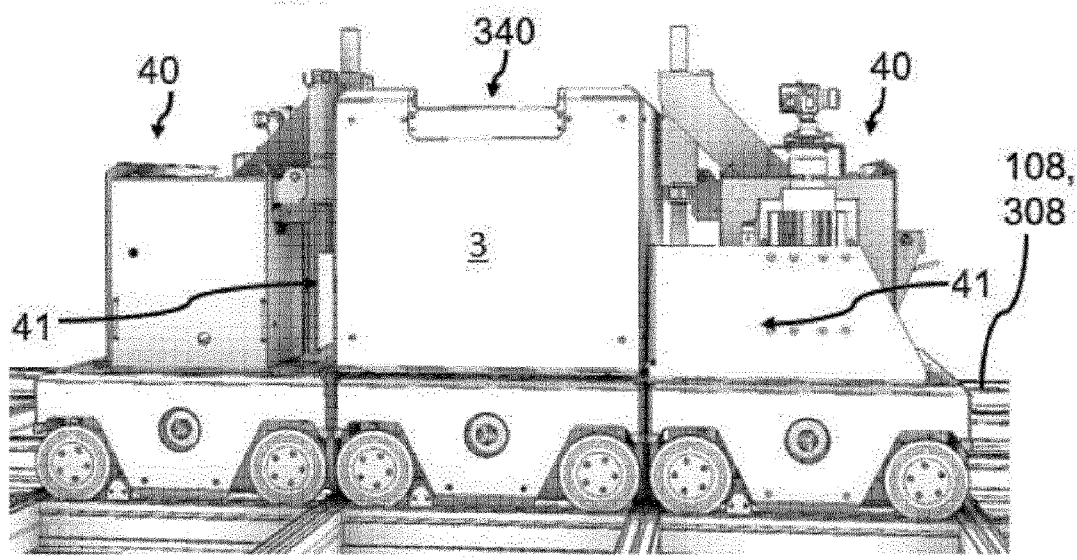

Referring to FIGS. 7B and 7C, the other of the rescue vehicles 40 has positioned itself on an opposite side of the malfunctioning delivery vehicle 340. FIG. 7C is an opposite view of FIG. 7B.

Figure 7D:
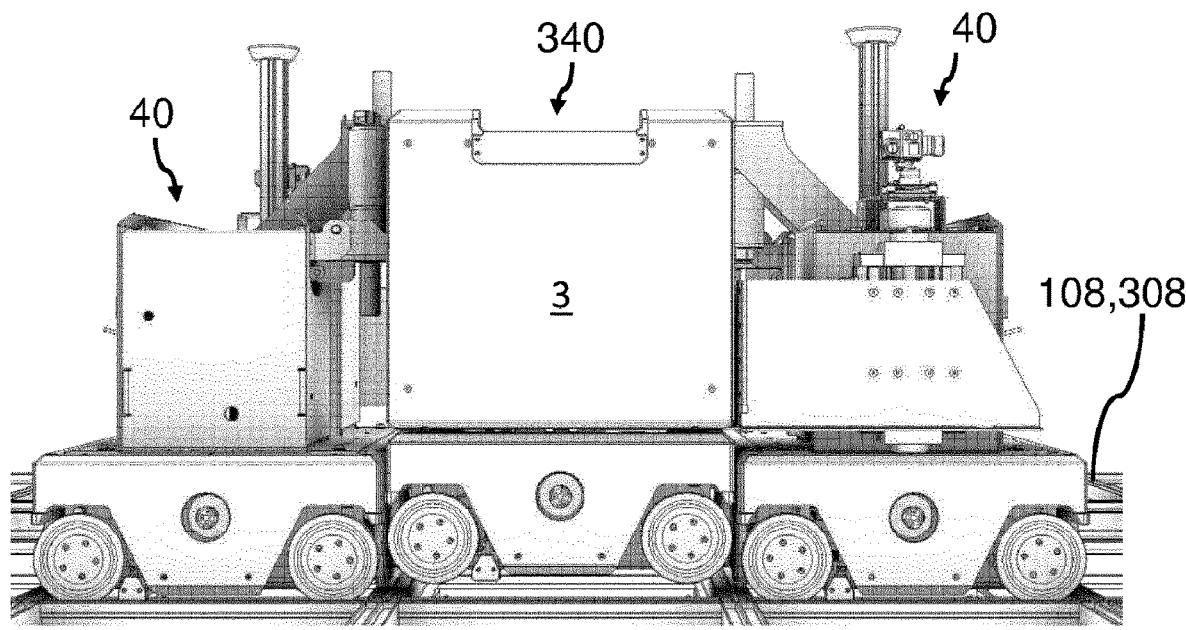
Figure 7E:
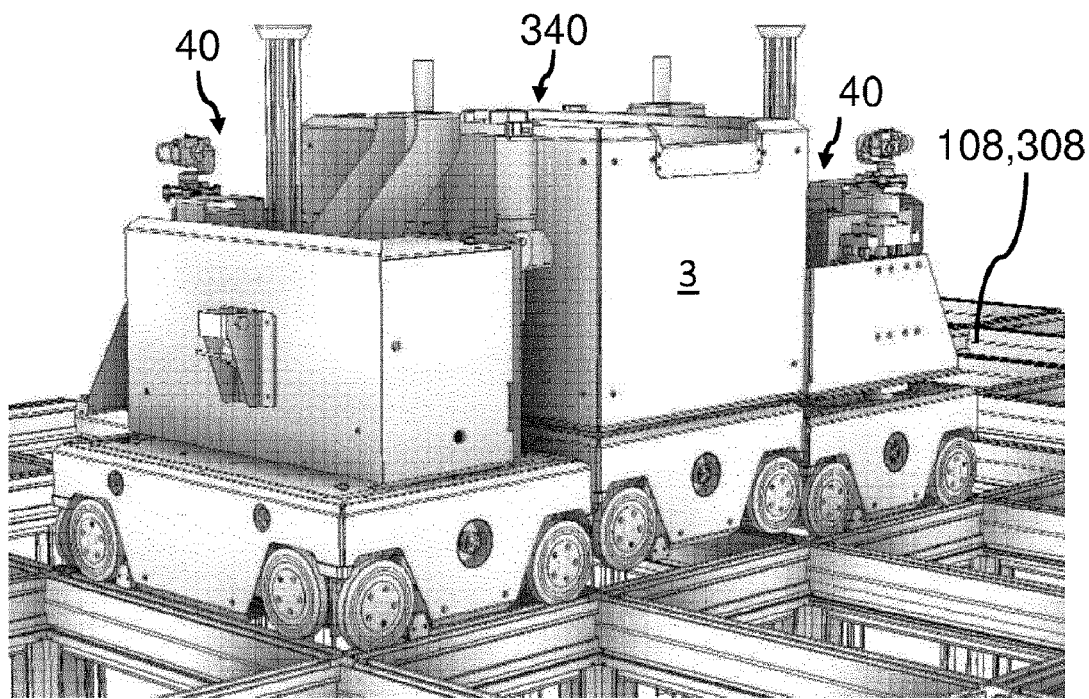

Referring to FIGS. 7D and 7E, the first and second rescue vehicles 40 have lifted the malfunctioning delivery vehicle off the rail system 108,308 by operating the lifting devices 41 simultaneously (i.e. in tandem). The malfunctioning delivery vehicle 340 may be transported off the rail system 108,308 to a dedicated area, such that a service area or similar. FIG. 7E is a perspective side view of FIG. 7D.

Figure 8A:
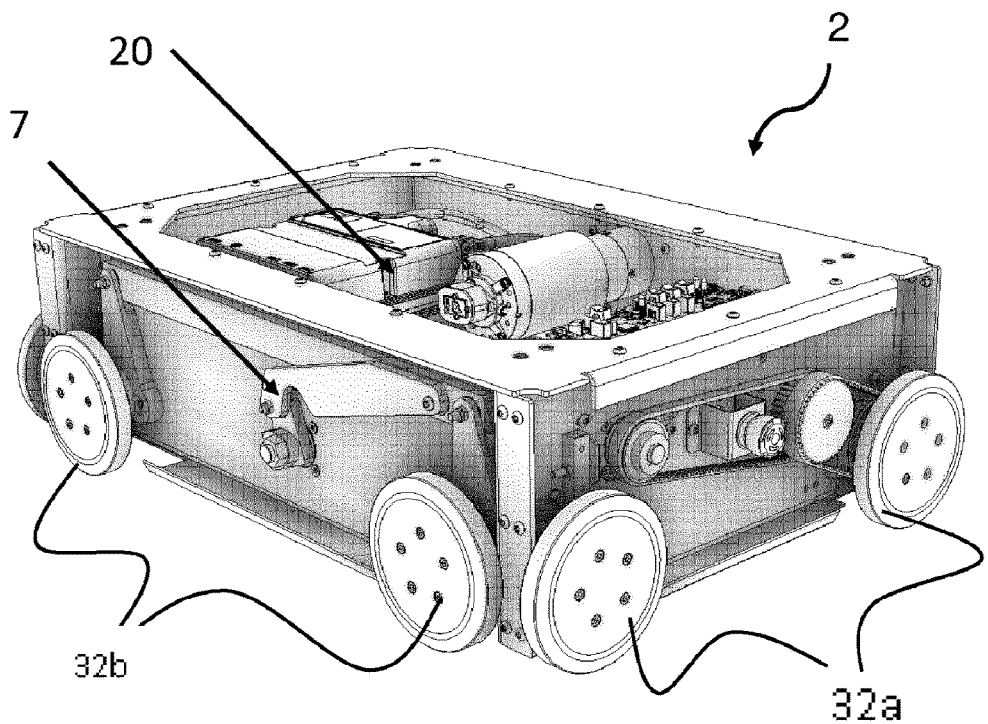
FIGS. 8A and 8B show an exemplary wheel base unit.
Figure 8B:
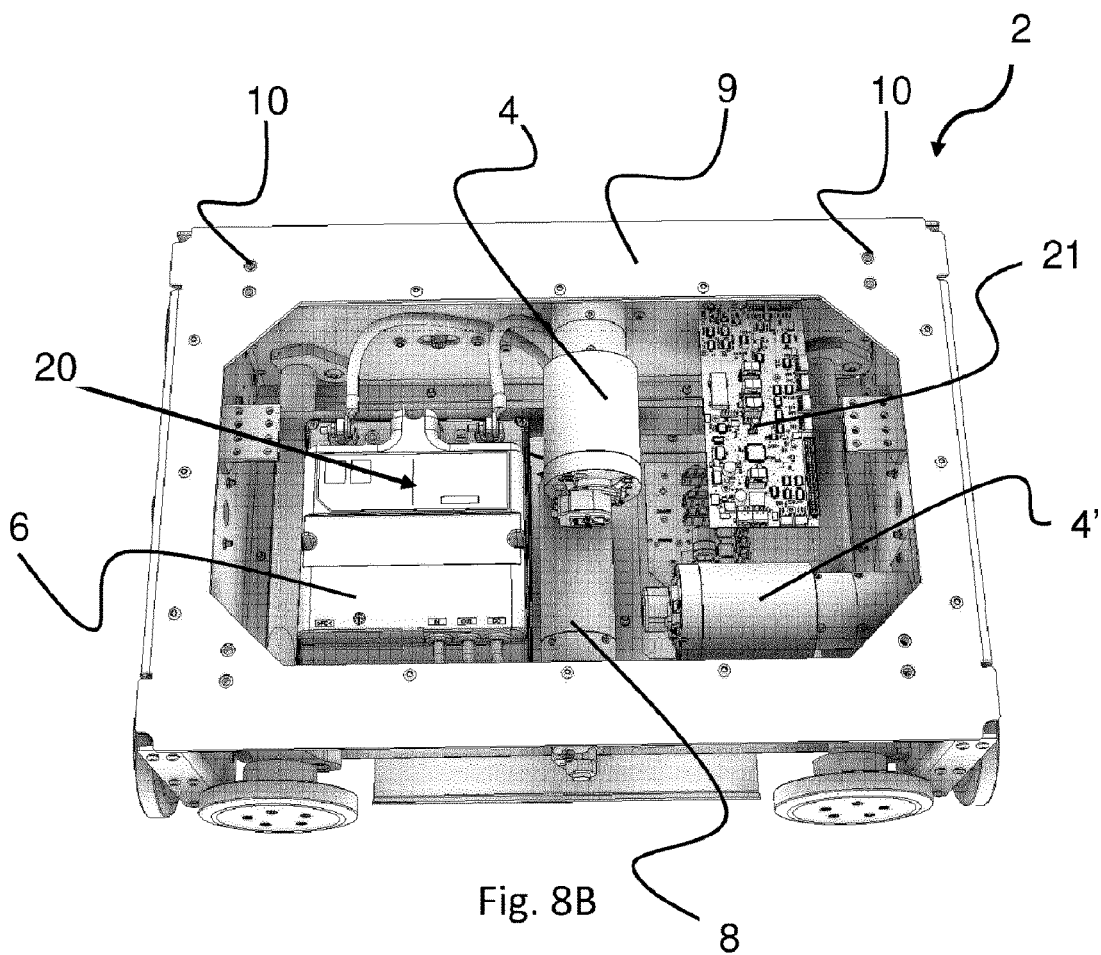

An exemplary combined wheel base unit for the rescue vehicles 40 and the delivery vehicles 340 is shown in FIGS. 8A and 8B. The wheel base unit 2 features a wheel arrangement 32a,32b having a first set of wheels 32a for movement in a first direction upon a rail system (i.e. any of the top rail system 108 and the delivery rail system 308) and a second set of wheels 32b for movement in a second direction perpendicular to the first direction. Each set of wheels comprises two pairs of wheels arranged on opposite sides of the wheel base unit 2. To change the direction in which the wheel base unit may travel upon the rail system, one of the sets of wheels 32b is connected to a wheel displacement assembly 7. The wheel displacement assembly is able to lift and lower the connected set of wheels 32b relative to the other set of wheels 32a such that only the set of wheels travelling in a desired direction is in contact with the rail system. The wheel displacement assembly 7 is driven by an electric motor 8. Further, two electric motors 4,4', powered by a rechargeable battery 6, are connected to the set of wheels 32a,32b to move the wheel base unit in the desired direction.

Further referring to FIGS. 8A and 8B, the horizontal periphery of the wheel base unit 2 is dimensioned to fit within the horizontal area defined by a grid cell, such that two wheel base units may pass each other on any adjacent grid cells of the rail system 108, 308. In other words, the wheel base unit 2 may have a footprint, i.e. an extent in the X and Y directions, which is generally equal to the horizontal area of a grid cell, i.e. the extent of a grid cell in the X and Y directions, e.g. as is described in WO2015/193278A1, the contents of which are incorporated herein by reference. The wheel base unit 2 has a top panel/flange 9 (i.e. an upper surface) configured as a connecting interface for connection to a connecting interface of a selected vehicle rescue module 48 or container supporting unit 3. The top panel 9 have a centre opening 20 and features multiple through-holes 10 (i.e. connecting elements) suitable for a bolt 11 connection via corresponding through-holes 10' in the connecting interface of a vehicle rescue module 48 or container supporting unit 3. In other embodiments, the connecting elements of the top panel 9 may for instance be threaded pins for interaction with the through-holes 10' of the connecting interface of the vehicle rescue module 48 or container supporting unit 3, or vice versa. The presence of a centre opening 20 is advantageous as it provides access to internal components of the wheel base unit, such as the rechargeable battery 6 and an electronic control system 21. The access allows the rechargeable battery 6 and the electronic control system 21 to be easily connected to a rescue module connected to the wheel base unit 2, thus the vehicle rescue module 48 nor container supporting unit 3 is not required to have its own dedicated power source and/or control system.

Figure 9A:
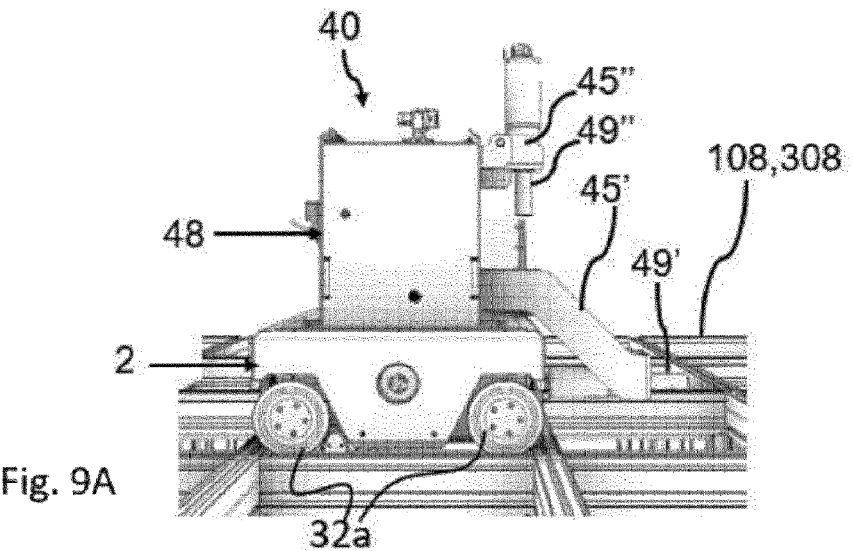
FIGS. 9A-9C show an example of the rescue vehicle of FIGS. 4A-C illustrating step by step the moving of the rotary drive from the stowed vertical to position to the deployed position using a pivotable actuator for manipulating the track shift motor of a container handling vehicle.
Figure 9B:
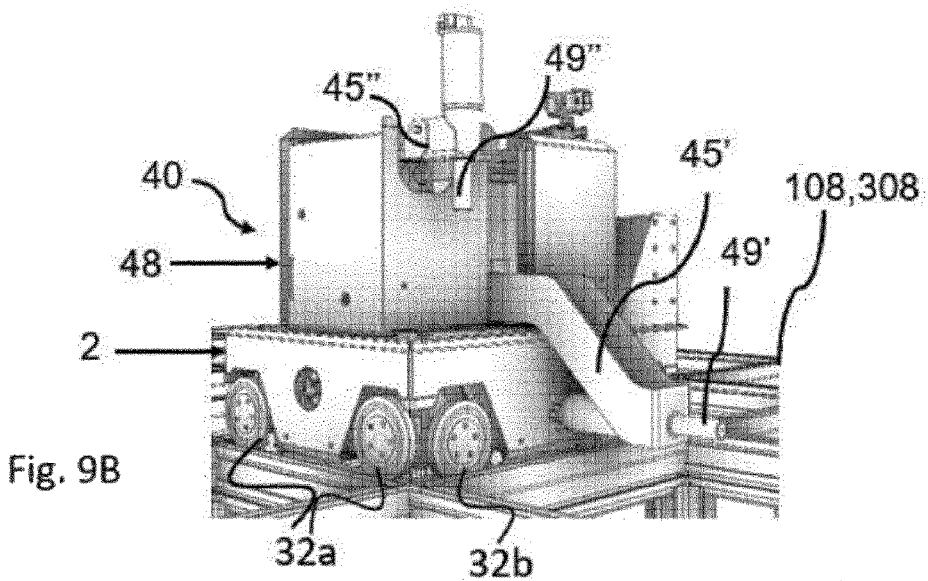
Figure 9C:
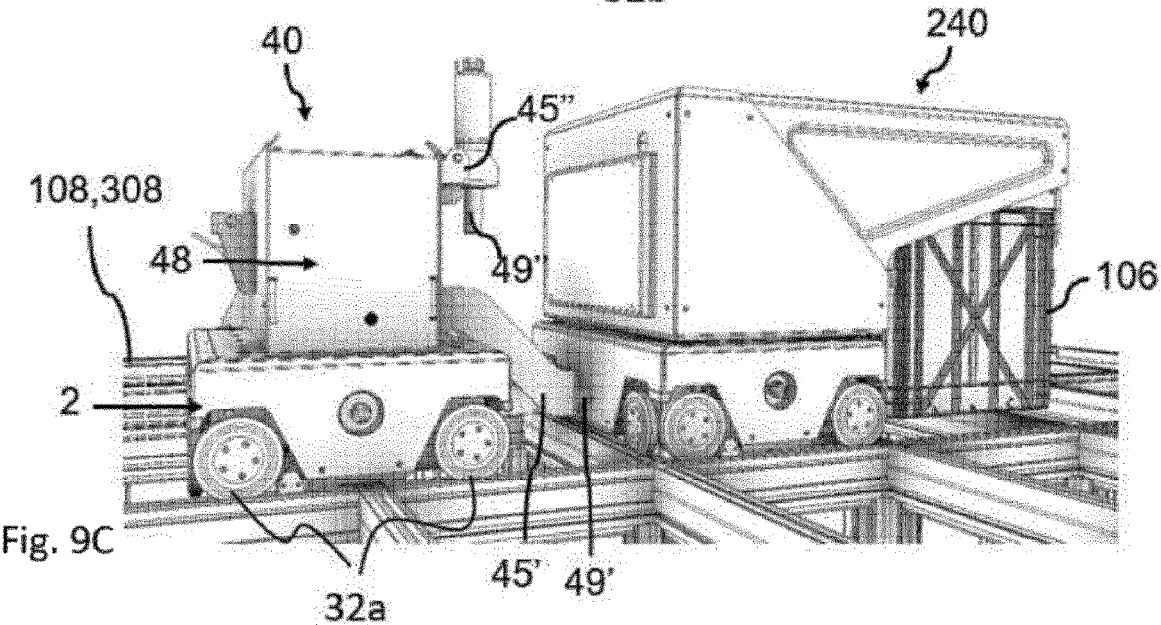

FIGS. 9A-9C show an example of the rescue vehicle 40 of FIGS. 4A-C illustrating step by step the moving of the rotary drive 49' from the stowed vertical to the deployed horizontal position using a pivotable actuator 45' for manipulating the track shift motor of a container handling vehicle 240. FIGS. 9A and 9B are two different perspective views of a rescue vehicle 40 where the rotary drive 49' for manipulating track shift has been pivoted to a deployed horizontal position using a pivotable actuator 45'. In FIG. 9C the rotary drive 49' is connected to the track shift of the malfunctioning container handling vehicle 240 and can manipulate the track shift motor. The other rotary drive 49" for manipulating the lifting frame/gripper motor of a malfunctioning vehicle 240 is in the stowed vertical position in all FIGS. 9A-9C.

Figure 10A:
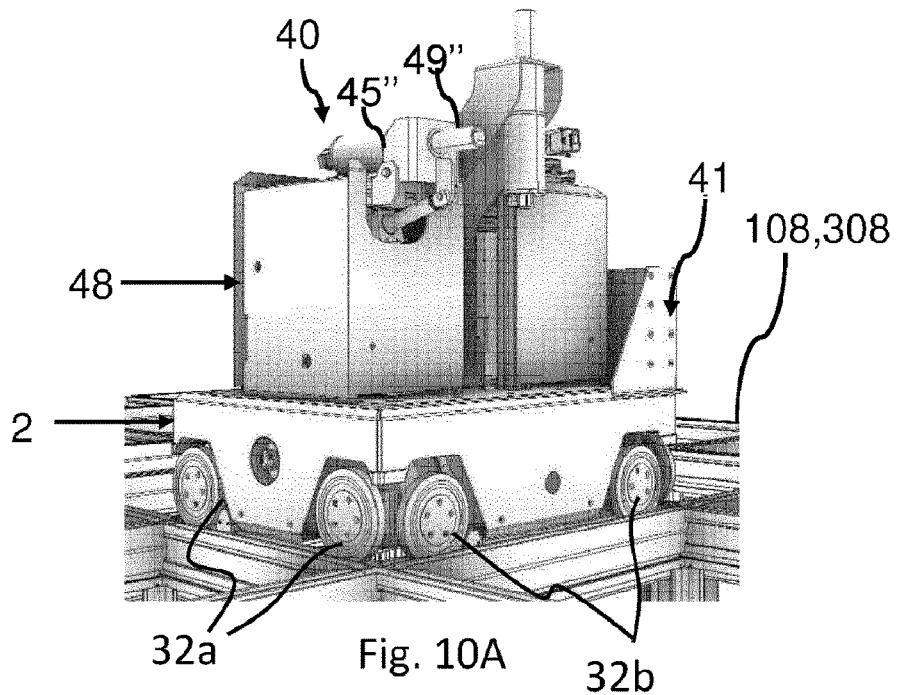
FIGS. 10A and 10B show an example of the rescue vehicle of FIGS. 9A-9C for manipulating a lifting frame motor of a container handling vehicle.
Figure 10B:
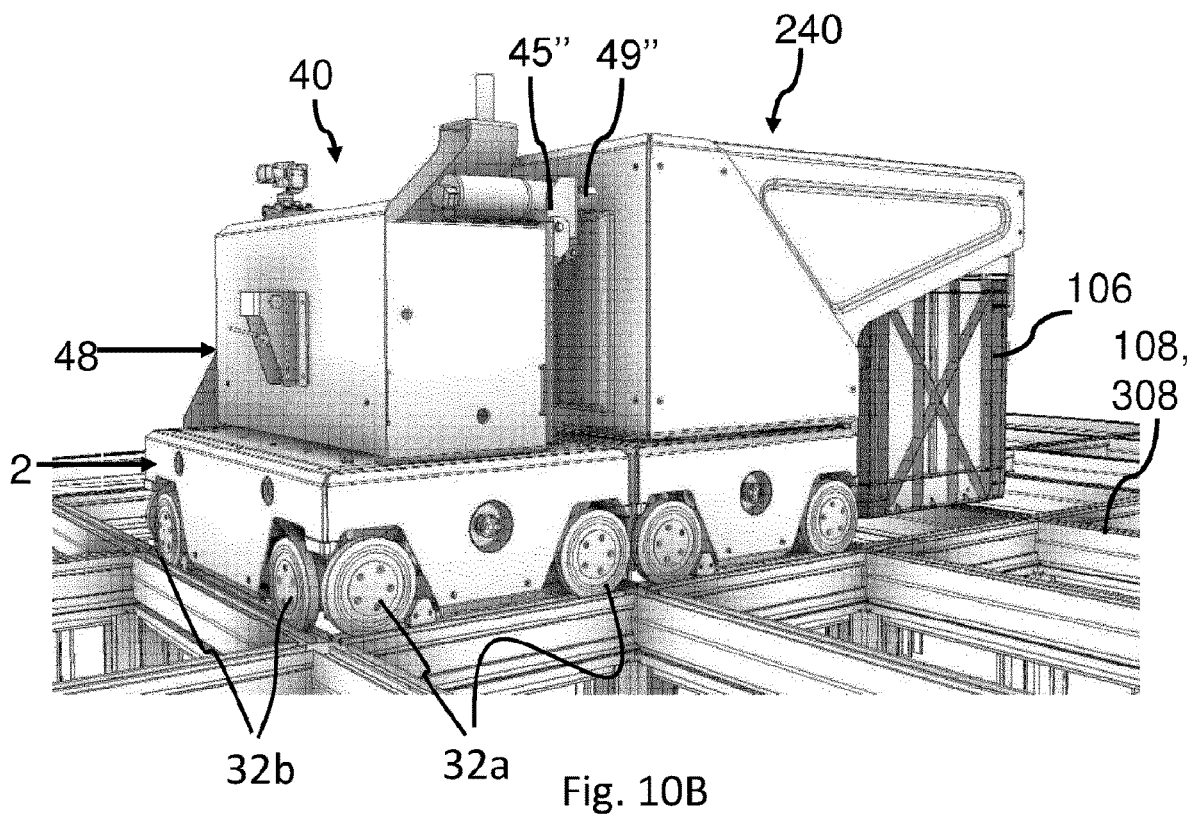

FIGS. 10A and 10B show an example of the rescue vehicle 40 of FIGS. 9A-9C for manipulating a lifting frame motor of a container handling vehicle, where in FIG. 10A the rotary drive 49" for manipulating the lifting frame motor is in a deployed horizontal position actuated by a pivotable actuator 4" but not connected to a container handling vehicle 240, whereas in FIG. 10B the rotary drive 49" is connected to an interface for winching up the lifting frame motor of the container handling vehicle 240 such that the lifting frame (possibly carrying a storage container 106) can be lifted up and above the rail system making it possible to transport the container handling vehicle 240. When the rotary drive 49" is in the stowed position, the rescue vehicle 40 has a footprint equal to or less than a grid cell of the rail system and in the deployed position, the rotary drive 49" extend into a neighboring grid cell by being pivoted from the deployed vertical position to the deployed horizontal position. This provides for the possibility that the service vehicle 40 does not occupy more than one cell when moving on the rail system.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

| | |
|---|---|
| 1 | Prior art storage and retrieval system |
| 2 | Wheel base unit |
| 3 | Container supporting unit |
| 4, 4' | Electric motor |
| 6 | Rechargeable battery |
| 7 | Wheel displacement assembly |
| 8 | Electric motor for wheel displacement assembly |
| 9 | Top panel/flange |
| 10 | Through-holes |
| 11 | bolt |
| 20 | Centre opening |
| 21 | Electronic control system |
| 32a, b | Wheel arrangement on wheel base unit, first and second set of wheels |
| 40 | Rescue vehicle |
| 41 | Lifting device |
| 42 | Vertical plate |
| 43 | lip |
| 44 | Visual inspection means/camera |
| 45', 45" | Pivotable actuator |
| 46 | Linear actuator |
| 48 | Rescue module |
| 49', 49", 49''' | Rotary drive |
| 50 | Recess |
| 100 | Framework structure |
| 102 | Upright members of framework structure |
| 103 | Horizontal members of framework structure |
| 104 | Storage grid |
| 105 | Storage column |
| 106 | Storage container |
| 106' | Particular position of storage container |
| 107 | Stack |
| 108 | Rail system |
| 110 | Parallel rails in first direction (X) |
| 110a | First rail in first direction (X) |
| 110b | Second rail in first direction (X) |
| 111 | Parallel rail in second direction (Y) |
| 111a | First rail of second direction (Y) |
| 111b | Second rail of second direction (Y) |
| 112 | Access opening |
| 119 | First port column |
| 120 | Second port column |
| 201 | Prior art storage container vehicle |
| 201a | Vehicle body of the storage container vehicle 101 |
| 201b | Drive means/wheel arrangement, first direction (X) |
| 201c | Drive means/wheel arrangement, second direction (Y) |
| 240 | Malfunctioning container handling vehicle |
| 300 | Delivery framework structure |
| 301 | Prior art cantilever storage container vehicle |
| 301a | Vehicle body of the storage container vehicle 101 |
| 301b | Drive means in first direction (X) |
| 301c | Drive means in second direction (Y) |
| 308 | Delivery rail system |
| 310 | First set of parallel rails in first direction (X) on delivery rail system |

| | |
|---|---|
| 311 | Second set of parallel rails in second direction (Y) on delivery rail system |
| 315 | Grid opening in delivery rail system |
| 322 | Grid cell of delivery rail system |
| 340 | Malfunctioning container delivery vehicle |
| 351 | Wheel assembly for container delivery vehicle |
| 352 | Storage container support |
| 500 | Control system |
| X | First direction |
| Y | Second direction |
| Z | Third direction |

The invention claimed is:

1. A rescue system for retrieving a malfunctioning vehicle from a rail system of an automated storage and retrieval system, the rail system comprising a plurality of rails with tracks extending in an X-direction and a plurality of rails with tracks extending in a Y-direction perpendicular to the X-direction, and a plurality of remotely operated vehicles configured to move in the X-direction and the Y-direction on the tracks of the rail system, wherein the rescue system comprises:
 a first rescue vehicle configured to run on the tracks of the rail system, the first rescue vehicle comprising a lifting device on one side of the first rescue vehicle, the lifting device configured to engage in a first X-direction, and a part of the lifting device extending into a neighboring cell when the first rescue vehicle is positioned in a center of a grid cell; and
 a second rescue vehicle configured to run on the tracks of the rail system, the second rescue vehicle comprising a lifting device on an opposite side of the second rescue vehicle relative to the one side of the first rescue vehicle, the lifting device configured to engage in a second X-direction opposite to the first X-direction, and a part of the lifting device extending into a neighboring cell when the second rescue vehicle is positioned in a center of a grid cell;
 wherein the first rescue vehicle and the second rescue vehicle are configured to work in tandem so that when one of the plurality of remotely operated vehicles malfunctions, the first rescue vehicle and the second rescue vehicle position themselves on the rail system on opposite sides of the malfunctioning vehicle to engage their respective lifting devices with the opposite sides of the malfunctioning vehicle and operate their lifting devices simultaneously so as to lift the malfunctioning vehicle off the rail system and transport the malfunctioning vehicle.

2. The rescue system of claim 1, wherein each respective lifting device comprises a vertical plate with a lip extending therefrom, and wherein the part of each respective lifting device is the corresponding lip.

3. The rescue system of claim 1, wherein the rescue system further comprises a control system, and wherein the control system comprises cooperative communication means configured to communicate with the communication means of the first rescue vehicle and the second rescue vehicle to operate synchronously.

4. The rescue system of claim 1, wherein the rail system is at a top level of the automated storage and retrieval system.

5. The rescue system of claim 1, wherein the rail system is a delivery rail system.

6. The rescue system of claim 1, wherein each of the first rescue vehicle and the second rescue vehicle comprises two set of wheels for movement in the X-direction and the Y-direction along the rail system.

7. The rescue system of claim 1, wherein the lifting device comprises an actuator configured to raise and lower the malfunctioning vehicle relative the rail system.

8. The rescue system of claim 1, wherein the first rescue vehicle and the second rescue vehicle each comprise communication means for synchronous operation.

9. The rescue system of claim 8, wherein the communication means enables communication between the first rescue vehicle and the second rescue vehicle.

10. The rescue system of claim 9, wherein the first rescue vehicle is a master rescue vehicle and the second rescue vehicle is a slave rescue vehicle configured to be at least partly operated by instructions from the master rescue vehicle; or
 wherein the second rescue vehicle is a master rescue vehicle and the first rescue vehicle is a slave rescue vehicle configured to be at least partly operated by instructions from the master rescue vehicle.

11. The rescue system of claim 1, wherein at least one of the first rescue vehicle or the second rescue vehicle comprises at least one rotary drive to winch up one or more of:
 a lifting frame; and
 a track shift motor of the malfunctioning vehicle.

12. The rescue system of claim 11, wherein the at least one rotary drive is pivotable, an axis of the rotary drive is configured to be pivoted between a stowed vertical position during movement of at least one of the first rescue vehicle or the second rescue vehicle on the rail system, and the axis of the rotary drive is further configured to be pivoted to a deployed horizontal position for winching up one or more of:
 a lifting frame; and
 a track shift motor of the malfunctioning vehicle.

13. The rescue system of claim 12, wherein the rotary drive for the lifting frame is arranged in an upper part of the rescue vehicle, and wherein, when in the deployed horizontal position, the rotary drive is supported by an actuator.

14. The rescue system of claim 12, wherein the rotary drive is connected to a linear actuator for movement between the stowed vertical position and the deployed horizontal position, and wherein, when in the stowed vertical position, a perimeter of the rotary drive is arranged within a horizontal perimeter of a wheel base unit, and wherein, when in the deployed horizontal position, at least a portion of the rotary drive extends beyond a perimeter of a wheel base unit.

15. A rescue system for retrieving a malfunctioning vehicle from a rail system of an automated storage and retrieval system, the rail system comprising a plurality of rails with tracks extending in an X-direction and a plurality of rails with tracks extending in a Y-direction perpendicular to the X-direction, the rails defining a plurality of grid cells, and a plurality of remotely operated vehicles configured to move in the X-direction and Y-direction on the tracks of the rail system, wherein the rescue system comprises:
 a first rescue vehicle comprising a first wheel base unit configured to run on the tracks of the rail system, the first wheel base unit providing a mobile platform corresponding in area to a single grid cell for a first vehicle rescue module mounted thereon, wherein the first vehicle rescue module is orientated in a first direction of the rail system;
 a second rescue vehicle comprising a second wheel base unit configured to run on the tracks of the rail system, the second wheel base unit providing a mobile platform corresponding in area to a single grid cell for a second vehicle rescue module mounted thereon, wherein the second vehicle rescue module is orientated in a second direction of the rail system opposite to the first direction;

wherein the first rescue vehicle and the second rescue vehicle are configured to work in tandem to perform rescue operations on the malfunctioning vehicle of the plurality of remotely operated vehicles, the first vehicle rescue module and the second vehicle rescue module comprise a lifting device; and wherein a part of the lifting device of the first vehicle rescue module extends into a neighboring cell when the first rescue vehicle is positioned in a center of a grid cell, a part of the lifting device of the second vehicle rescue module extends into a neighboring cell when the second rescue vehicle is positioned in a center of a grid cell, and the first vehicle rescue module and the second vehicle rescue module are arranged to engage opposite sides of the malfunctioning vehicle and lift the malfunctioning vehicle off the rail system using the respective lifting devices orientated in opposite facing directions.

16. The rescue system of claim 15, wherein the first vehicle rescue module and the second vehicle rescue module each comprise a lifting plate with a lip extending at a height above an upper surface of each respective wheel base unit; and wherein the part of each respective lifting device is the corresponding lip.

17. The rescue system of claim 15, wherein each remotely operated vehicle of the plurality of remotely operated vehicles comprises wheel base units providing mobile platforms, each mobile platform corresponding in area to a single grid cell of the rail system, for storage container lifting modules mounted thereon.

18. The rescue system of claim 15, wherein the wheel base units are identical.

19. A rescue vehicle for retrieving a malfunctioning vehicle from a rail system of an automated storage and retrieval system, the rail system comprising a plurality of rails with tracks extending in an X-direction and a plurality of rails with tracks extending in a Y-direction perpendicular to the X-direction, a plurality of remotely operated vehicles configured to move in the X-direction and the Y-direction on the tracks of the rail system, wherein the rescue vehicle comprises a wheel base unit configured to run on the tracks of the rail system, the wheel base unit providing a mobile platform corresponding in area to a single grid cell for a vehicle rescue module mounted thereon, the vehicle rescue module being orientated in a first direction of the rail system;

wherein the vehicle rescue module comprises a lip on at least one side of the vehicle rescue module arranged at a level above a level of the wheel base unit; and the lip extends into a neighboring cell when the rescue vehicle is positioned in a center of a grid cell.

20. The rescue vehicle of claim 19, further comprising a rotary drive to winch up one or more of:

a lifting frame; and a track shift motor of the malfunctioning vehicle.

21. An automated storage and retrieval system, comprising:

a framework structure comprising upright members, horizontal members and a storage volume, the storage volume comprising storage columns arranged in rows between the upright members and the horizontal members, a plurality of storage containers stacked one on top of one another to form stacks, a rail system comprising a plurality of rails with tracks extending in an X-direction and a plurality of rails with tracks extending in a Y-direction perpendicular to the X-direction;

a plurality of remotely operated vehicles configured to move in the X-direction and the Y-direction on the tracks of the rail system; and a rescue system for retrieving a malfunctioning vehicle from the rail system, the rescue system comprising:

a first rescue vehicle configured to run on the tracks of the rail system, the first rescue vehicle comprising a lifting device on one side of the first rescue vehicle, the lifting device facing for engagement in a first X-direction;

a second rescue vehicle configured to run on the tracks of the rail system, the second rescue vehicle comprising a lifting device on an opposite side of the second rescue vehicle relative to the one side of the first rescue vehicle, the lifting device configured to engage in a second X-direction opposite to the first X-direction; and wherein the first rescue vehicle and the second rescue vehicle are configured to work in tandem so that when one of the plurality of remotely operated vehicles malfunctions, the first rescue vehicle and the second rescue vehicle position themselves on the rail system on opposite sides of the malfunctioning vehicle to engage their respective lifting devices with the opposite sides of the malfunctioning vehicle and operate their lifting devices simultaneously so as to lift the malfunctioning vehicle off the rail system and transport the malfunctioning vehicle.

22. A method of retrieving a malfunctioning vehicle from a rail system with perpendicular tracks in an X-direction and a Y-direction, wherein a plurality of remotely operated vehicles are arranged on the rail system, each remotely operated vehicle of the plurality of remotely operated vehicles comprises a vehicle body and side portions, wherein at least two opposite side portions on each remotely operated vehicle of the plurality of remotely operated vehicles comprises a recess, and wherein the method comprises:

determining an anomaly in an operational condition of a remotely operated vehicle of the plurality of remotely operated vehicles on the rail system;

registering the remotely operated vehicle with the anomalous operational condition as a malfunctioning vehicle;

registering a position of the malfunctioning vehicle relative to the rail system;

operating a first rescue vehicle configured to run on the perpendicular tracks, the first rescue vehicle provided with a lifting device on one side of the first rescue vehicle, the lifting device configured to engage in a first X-direction, and a part of the lifting device extending into a neighboring cell when the first rescue vehicle is positioned in a center of a grid cell;

operating a second rescue vehicle configured to run on the perpendicular tracks of, the second rescue vehicle comprising a lifting device on an opposite side of the second rescue vehicle relative to the one side of the first rescue vehicle, the lifting device configured to engage in a second X-direction opposite to the first X-direction, and a part of the lifting device extending into a neighboring cell when the second rescue vehicle is positioned in a center of a grid cell;

operating the first rescue vehicle and the second rescue vehicle in tandem by positioning the first rescue vehicle and the second rescue vehicle on opposite sides of the malfunctioning vehicle;

engaging the respective lifting devices with the opposite sides of the malfunctioning vehicle; and operating the lifting devices simultaneously so as to lift the malfunctioning vehicle off the rail system and transport the malfunctioning vehicle.

23. The method of claim 22, wherein the method further comprises, prior to engaging the parts of the respective lifting devices, operating a rotary drive to winch up one or more of:

a lifting frame; and a track shift motor of the malfunctioning vehicle.

24. A method of retrieving a malfunctioning vehicle from a rail system with perpendicular tracks in X-direction and Y-direction, wherein a plurality of remotely operated vehicles are arranged on the rail system, each remotely operated vehicle of the plurality of remotely operated vehicles comprises a vehicle body and side portions, wherein at least two opposite side portions on each remotely operated vehicle of the plurality of remotely operated vehicles comprises a recess, and wherein the method comprises:

determining an anomaly in an operational condition of a remotely operated vehicle of the plurality of remotely operated vehicles on the rail system;

registering the remotely operated vehicle with the anomalous operational condition as a malfunctioning vehicle;

registering a position of the malfunctioning vehicle relative to the rail system;

operating a first rescue vehicle comprising a first wheel base unit, the first rescue vehicle configured to run on the perpendicular tracks, the first wheel base unit providing a mobile platform corresponding in area to a single grid cell for a first vehicle rescue module mounted thereon, the first vehicle rescue module orientated in a first direction of the rail system;

operating a second rescue vehicle comprising a second wheel base unit, the second rescue vehicle configured to run on the perpendicular tracks, the second wheel base unit providing a mobile platform corresponding in area to a single grid cell for a second vehicle rescue module mounted thereon, the second vehicle rescue module orientated in a second direction of the rail system opposite to the first direction;

operating the first rescue vehicle and the second rescue vehicle in tandem to perform rescue operations on the malfunctioning vehicle, the first vehicle rescue module and the second vehicle rescue module each comprising a lifting device, wherein a part of the lifting device of the first vehicle rescue module extends into a neighboring cell when the first rescue vehicle is positioned in a center of a grid cell, and wherein a part of the lifting device of the second vehicle rescue module extends into a neighboring cell when the second rescue vehicle is positioned in a center of a grid cell;

engaging the parts of the respective lifting devices that extend into the respective neighboring cells on opposite sides of the malfunctioning vehicle, lifting the malfunctioning vehicle off the rail system.

* * * * *